(12) United States Patent
Yang et al.

(10) Patent No.: US 11,490,308 B2
(45) Date of Patent: Nov. 1, 2022

(54) METHOD FOR SWITCHING BETWEEN NETWORK ELEMENTS AND NETWORK ELEMENT SELECTION, USER EQUIPMENT, NETWORK ELEMENT

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 43 days.

(21) Appl. No.: 17/024,638

(22) Filed: Sep. 17, 2020

(65) Prior Publication Data
US 2021/0007027 A1 Jan. 7, 2021

Related U.S. Application Data

(63) Continuation of application No. PCT/CN2018/109538, filed on Oct. 9, 2018.

(30) Foreign Application Priority Data

Mar. 29, 2018 (WO) ............... PCT/CN2018/081102

(51) Int. Cl.
*H04W 4/00* (2018.01)
*H04W 36/14* (2009.01)
(Continued)

(52) U.S. Cl.
CPC ........... *H04W 36/14* (2013.01); *H04W 48/18* (2013.01); *H04W 60/00* (2013.01); *H04W 76/11* (2018.02); *H04W 76/25* (2018.02)

(58) Field of Classification Search
CPC ..... H04W 36/14; H04W 48/18; H04W 60/00; H04W 76/11; H04W 76/25; H04W 36/12;
(Continued)

(56) References Cited

U.S. PATENT DOCUMENTS

| 8,472,405 B2 | 6/2013 | Rune |
| 8,687,595 B2 | 4/2014 | Yu |

(Continued)

FOREIGN PATENT DOCUMENTS

| CN | 101026861 A | 8/2007 |
| CN | 101415176 A | 4/2009 |

(Continued)

OTHER PUBLICATIONS

SA WG2 Meeting #S2-128BIS, S2-187655, Sophia Antipolis, France, TSG RAN WG2, "Reply LS on inclusion of NSSAI in RRC connection establishment procedure", mailed on Aug. 20-24, 2018.
(Continued)

*Primary Examiner* — Marcos Batista
(74) *Attorney, Agent, or Firm* — Perkins Coie LLP

(57) ABSTRACT

Disclosed by the present invention are a method for switching between network elements and network element selection, user equipment (UE), network elements and a computer storage medium, the method comprising: initiating a request message to the network side, wherein the request message includes: information carrying a second network element at an AS layer, such that the network side can send the request message to a corresponding network element by means of the information of the second network element; the request message further includes: information carrying a first network element or a second network element at a NAS layer.

20 Claims, 9 Drawing Sheets

(51) Int. Cl.
*H04W 76/25* (2018.01)
*H04W 76/11* (2018.01)
*H04W 48/18* (2009.01)
*H04W 60/00* (2009.01)

(58) Field of Classification Search
CPC ......... H04W 36/0022; H04W 36/0055; H04W 36/06; H04W 36/0005; H04W 36/385
USPC .................. 370/329, 331; 455/312, 436, 437
See application file for complete search history.

(56) References Cited

U.S. PATENT DOCUMENTS

| | | | |
|---|---|---|---|
| 8,995,399 | B2 | 3/2015 | Yu et al. |
| 2011/0200011 | A1 | 8/2011 | Rune |
| 2011/0249654 | A1 | 10/2011 | Yu et al. |
| 2013/0010754 | A1 | 1/2013 | Xu |
| 2014/0140325 | A1 | 5/2014 | Yu et al. |
| 2015/0057003 | A1* | 2/2015 | Dwyer ............... H04W 36/0066 455/437 |
| 2018/0324577 | A1* | 11/2018 | Faccin .................. H04W 76/27 |
| 2019/0364495 | A1* | 11/2019 | Mildh .................. H04W 48/18 |

FOREIGN PATENT DOCUMENTS

| | | |
|---|---|---|
| CN | 101765094 A | 6/2010 |
| CN | 102869122 A | 1/2013 |
| CN | 103188650 A | 7/2013 |
| CN | 104581990 A | 4/2015 |
| CN | 106375987 A | 2/2017 |
| CN | 106572516 A | 4/2017 |
| CN | 107071799 A | 8/2017 |
| CN | 107277883 A | 10/2017 |
| EP | 2645803 A1 | 10/2013 |
| EP | 3327992 A1 | 5/2018 |
| WO | 2010044730 A2 | 4/2010 |
| WO | 2018208371 A1 | 11/2018 |

OTHER PUBLICATIONS

English translation of the Written Opinion of the International Search Authority in the international application No. PCT/CN2018/109538, dated Jan. 7, 2019.
English translation of the Written Opinion of the International Search Authority in the international application No. PCT/CN2018/081102, dated Jan. 7, 2019.
Apple, Inc. "Configure AMF to Periodically Re-allocate 5G-GUTI" S2-181779, Mar. 2, 2018(Mar. 2, 2018), entire document.
International Search Report in the international application No. PCT/CN2018/109538, dated Jan. 7, 2019.
International Search Report in the international application No. PCT/CN2018/081102, dated Jan. 7, 2019.
3rd Generation Partnership Project; Technical Specification Group Services and System Aspects; Procedures for the 5G System; Stage 2 (Release 15); 3GPP TS 23.502 V15.0.0 (Dec. 2017); http://www.3gpp.org.
MediaTek Inc et al, "Allowed NSSAI and Access Type", 3GPP TSG-SA2 Meeting #126 S2-182914, Mar. 2, 2018. 9 pages.
Nokia et al, "Network Slice access Subscription Management by a third party-message flow P-CR", SA WG2 Meeting #122bis S2-175694, Aug. 25, 2017. 12 pages.
Oppo et al., "Adding PRA related description in 23.502", SA WG2 Meeting #124 S2-179174, Dec. 1, 2017. 19 pages.
Qualcomm Incorporated et al, "TS 23.502: Transport mechanism for the UE Policies", SA WG2 Meeting #S2-124 S2-178607, Dec. 1, 2017. 11 pages.
First Office Action of the Chinese application No. 202010525109.2, dated Aug. 2, 2021. 22 pages with English translation.
Second Office Action of the Chinese application No. 202010525109.2, dated Oct. 25, 2021. 10 pages with English translation.
NEC: "pCR to TR 33.899: Inter AMF, Intra SMF, Inter NG RAN handover without Xn interface", 3GPP Draft; Draft S3-171602 WAS S3-171181R1, 3rd Generation Partnership Project (3GPP), Mobile Competence Centre; 650, vol. SA WG3, No. Ljubljana; May 15, 2017-May 19, 2017, Jun. 5, 2017 (Jun. 5, 2017), XP051284072.
Anonymous: "3rd Generation Partnership Project; Technical Specification Group Services and System Aspects; Procedures for the 5G System; Stage 2 (Release 15)", 3GPP Standard; Technical Specification; 3GPP TS 23.502, Mobile Competence Centre; 650, Route Des Lucioles; F-06921 Sophia-Antipolis Cedex; France, No. V15.1.0, Mar. 27, 2018 (Mar. 27, 2018), XP051450527.
Huawei: "5GC involved inter registration area mobility", 3GPP Draft; R3-173901, 3rd Generation Partnership Project (3GPP), Mobile Competence Centre; 650, Route Des Lucioles; F-06921 Sophia-Antipolis Cedex; FR, vol. Ran WG3, No. Prague, Czech; Oct. 9, 2017-Oct. 13, 2017, Oct. 9, 2017 (Oct. 9, 2017), XP051344313.
Motorola Mobility et al: "Solution for 5G-RG Registration to 5GC", 3GPP Draft; S2-182882_2499_2117_5WWC_5G-RG Registration, 3rd Generation Partnership Project (3GPP), Mobile Competence Centre; 650, Route Des Lucioles;F-06921 Sophia-Antipolis Cedex; France, vol. SA WG2, No. Montreal, Canada; Feb. 26, 2018-Mar. 2, 2018, Mar. 2, 2018 (Mar. 2, 2018), XP051394477.
Motorola Mobility et al: "GRE encapsulation for NAS signalling", 3GPP Draft; S2-179155_8707_GRE_ENCAPSULATION, 3rd Generation Partnership Project (3GPP),Mobile Competence Centre; 650, Route Des Lucioles;F-06921 Sophia-Antipolis Cedex; France,vol. SA WG2, No. Reno, Nevada; Nov. 27, 2017-Dec. 1, 2017, Nov. 30, 2017 (Nov. 30, 2017), XP051365801.
Supplementary European Search Report in the European application No. 18912579.2, dated Jun. 28, 2021.
Partial Supplementary European Search Report in the European application No. 18912579.2, dated Apr. 15, 2021.
Office Action of the Indian application No. 202017046251, dated Dec. 3, 2021. 7 pages with English translation.
Third Office Action of the Chinese application No. 202010525109.2, dated Jan. 11, 2022. 11 pages with English translation.
Second Office Action of the European application No. 18912579.2, dated Sep. 8, 2022 (7 pages).
Written Opinion of the Singaporean application No. 11202009678Y, dated Jun. 29, 2022 (12 pages).

* cited by examiner

METHOD FOR SWITCHING BETWEEN NETWORK ELEMENTS AND NETWORK ELEMENT SELECTION, USER EQUIPMENT, NETWORK ELEMENT

CROSS-REFERENCE TO RELATED APPLICATIONS

The application is a continuation application of PCT Application No. PCT/CN2018/109538 filed on Oct. 9, 2018, which claims priority to International Application No. PCT/CN2018/081102 filed on Mar. 29, 2018, and the entire disclosures of both applications are hereby incorporated by reference.

BACKGROUND

Currently, there are three ways for handover between network elements: a way in which the handover is determined by a Radio Access Network (RAN) in a registration process; the way in which a redirection to a target Access and Mobility Management Function (AMF) is triggered after an original AMF receives a Non-Access Stratum (NAS) message; and a way in which 5-th Generation (5G) and 4-th Generation (4G) Global Unique Temporary Identities (GUTIs) are used.

However, in the above solutions, there is a problem that the handover between network elements performed by a UE will be limited by the current process of the UE. As a result, it causes problems such as insufficient convenience for of the handover between network elements by the UE.

SUMMARY

The present disclosure relates to the field of information processing technology, and in particular, to a method for handover between network elements, a method for network element selection, User Equipment (UE), a network element, and a computer storage medium.

The embodiments of the disclosure provide a method for handover between network elements, applied to User Equipment (UE), including:

initiating a request message to a network side, where the request message includes information of a second network element, which is carried in an Access Stratum (AS), so that the network side is capable of transmitting the request message to a corresponding network element according to the information of the second network element; the request message further comprises at least one of: information of a first network element or the information of the second network element, which is carried in a Non-Access Stratum (NAS).

The embodiment of the disclosure provide a method for network element selection, applied to User Equipment (UE), including:

when the UE transmits a second message, if there is network slice information and Globally Unique Temporary Identity (GUTI) information, carrying the network slice information in at least one of an Access Stratum (AS) or a Non-Access Stratum (NAS), and not carrying the GUTI information;

Or, when the UE transmits a second message, if there is network slice information and GUTI information, carrying the GUTI information in at least one of the AS or the NAS, and not carrying the network slice information.

The embodiments of the disclosure provide a method for handover between network elements, applied to a first network element, including:

determining to switch User Equipment (UE) to a second network element; and transmitting a configuration request message to the UE.

The embodiments of the disclosure provide a method for network element selection, applied to a first network element, including:

receiving a second message from User Equipment (UE), where the UE carries network slice information in at least one of an Access Stratum (AS) or a Non-Access Stratum (NAS), and does not carry Globally Unique Temporary Identity (GUTI) information; and, selecting a core network element according to the network slice information;

Or, receiving a second message from UE, where the UE carries GUTI information in at least one of the AS or the NAS, and does not carry network slice information; and, selecting a core network element according to the GUTI information.

The embodiments of the disclosure provide User Equipment (UE), including:

A first communication unit, is configured to initiate a request message to a network side, where the request message comprises information of a second network element, which is carried in an AS, so that the network side is capable of transmitting the request message to a corresponding network element according to the information of the second network element; the request message further comprises at least one of: information of a first network element or the information of the second network element, which is carried in a NAS.

The embodiments of the disclosure provide a first network element, including:

a second processing unit, configured to determine to switch User Equipment (UE) to a second network element; and a second communication unit, configured to transmit a configuration request message to the UE.

The embodiments of the disclosure provide UE, including:

a third communication unit, configured to, when transmitting a second message and if there is network slice information and Globally Unique Temporary Identity (GUTI) information, carry the network slice information in at least one of an Access Stratum (AS) or a Non-Access Stratum (NAS), and not carry the GUTI information;

Or, when transmitting a second message, if there is network slice information and GUTI information, carry the GUTI information in at least one of the AS or the NAS, and not carry the network slice information.

The embodiments of the disclosure provide a first network element, including:

a fourth communication unit, configured to receive a second message from User Equipment (UE), where the UE carries network slice information in at least one an AS or a NAS, and does not carry GUTI information;

a fourth processing unit, configured to select a core network element according to the network slice information;

Or, a fourth communication unit, configured to receive a second message from UE, where the UE carries GUTI information in at least one of the AS or the NAS, and does not carry network slice information; and a fourth processing unit, configured to select a core network element according to the GUTI information.

The embodiments of the disclosure provide User Equipment UE, including a processor and a memory storing a computer program, where the processor is configured to implement operations of the aforementioned methods when the computer program is executed by the processor.

The embodiments of the disclosure provide a network element, including a processor and a memory storing a computer program executable by the processor, where the processor is configured to implement operations of the aforementioned methods when the computer program is executed by the processor.

The embodiments of the disclosure provide a computer storage medium having stored thereon computer-executable instructions that, when executed, cause operations of the aforementioned methods to be performed.

By technical solutions of the embodiments of the disclosure, it is possible to hand over between the network elements corresponding to UE based on a request information. As such, the handover between network elements may be implemented immediately without being limited by the current process of the UE. For instance, the UE is redirected to improve the processing efficiency of the UE.

DETAILED DESCRIPTION

In order to understand the features and technical contents of the embodiments of the disclosure in more detail, the implementation of these embodiments will be elaborated below in combination with the drawings. The attached drawings are for reference only and are not intended to limit the embodiments of the disclosure.

First Embodiment

The embodiment of the disclosure provides a method for handover between network elements, applied to User Equipment (UE), the method including:

initiating a request message to a network side, where the request message includes information of a second network element, which is carried in an Access Stratum (AS), so that the network side is capable of transmitting the request message to a corresponding network element according to the information of the second network element; the request message further comprises at least one of: information of a first network element or the information of the second network element, which is carried in a Non-Access Stratum (NAS).

Figure 1:
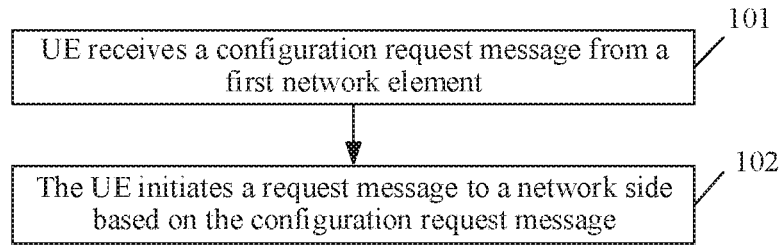
FIG. 1 is a first schematic flowchart of a method for handover between network elements according to an embodiment of the disclosure.

The technical solution provided by this embodiment is as illustrated in FIG. 1, which includes the following operations.

In an operation 101, the UE receives a configuration request message from the first network element.

In an operation 102, the UE initiates a request message to a network side based on the configuration request message.

The configuration request message comprises at least one of: registration type, identification information of the second network element, an indication of a Globally Unique Temporary Identity (GUTI) required to be used by the AS, NAS type used, message type used, or information used to find the AMF or Mobility Management Entity (MME) (requested network slice information or GUTI information). Herein, the GUTI required to be used by the AS includes at least part of information of a GUTI corresponding to the second network element. Herein, the registration type includes one of: initial registration, registration update, or emergency registration. The NAS type includes 5GC-NAS or EPC-NAS.

The first network element is a RAN base station.

Figure 2:
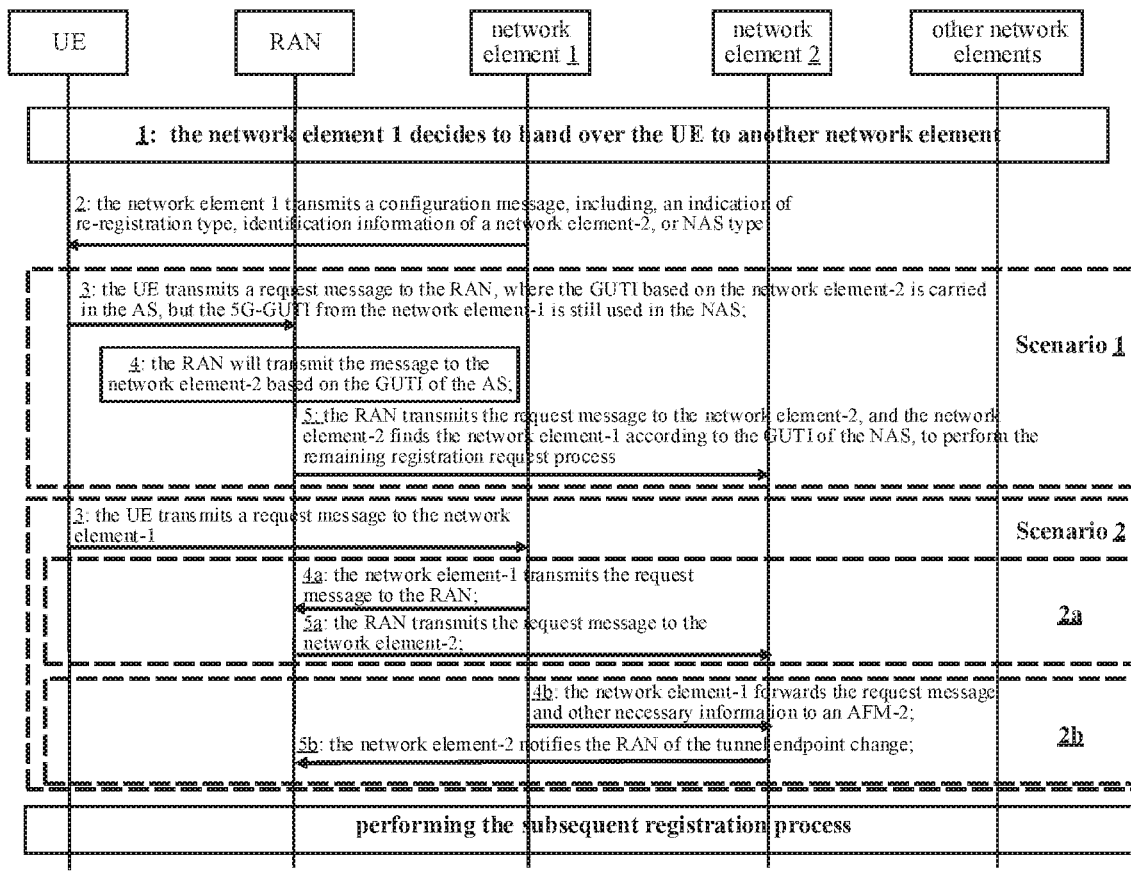
FIG. 2 is a second schematic flowchart of a method for handover between network elements according to an embodiment of the disclosure.

For example, as illustrated in FIG. 2, the first network element is assumed to be a network element 1 in the figure.

In operations 1 and 2, when the network element 1 decides to hand over the UE to another network element, the network element 1 (which can specifically be the AMF) transmits the configuration request message, where the configuration request message may include the following items: 1) request message type (Initial/Update/Emergency); 2) an indication of identification information of a target network element-2, or an indication of a GUTI required to be used by the AS (including the information of the target network element-2, instead of the information of the network element-1); 3) NAS type (5GC-NAS or EPC-NAS); 4) information used to find the AMF/MME Accordingly, if item 1) is included, then when the AMF initiates the request message, the type (Update/Initial/Emergency or any other type) of this request message is indicated.

If item 2) is included, then in the Registration request message transmitted by the UE, a GUTI pointing to the network element-2 is added and included in the AS, and a GUTI pointing to the network element-1 is still included in the NAS.

Figure 14:
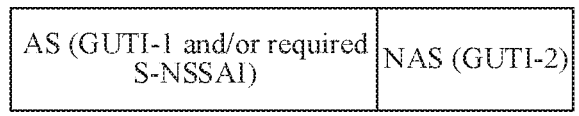
FIG. 14 is a schematic diagram of information content according to an embodiment of the disclosure.

If item 3) is included, the UE uses a 4G-NAS message or a 5G-NAS message according to the indication; if there is an indication of 4G-NAS, the UE needs to map the 5G-GUTI into 4G-GUTI or use an International Mobile Subscriber Identity (IMSI), and transmits a 4G-type message (e.g. Attach request/Tracking Area Update (TAU) Request). In this embodiment, the content of the AS and the NAS may be illustrated in FIG. 14. Herein, parameters of the AS may include a GUTI-1 and/or a requested Single Network Slice Selection Assistance Information (S-NSSAI), such as the information of the first network element; parameters of the NAS may include a GUTI-1, such as the information of the second network element.

If item 4) is included, first indication information is carried in the AS to instruct the RAN base station to select a core network element according to at least one of requested network slice information or GUTI information. Specifically, in the message transmitted by the UE, it is indicated that the RAN side determines a routing core network element according to specified information, and then transmits the NAS message to a specified core network element, where the specified information includes network slice information or GUTI information of AS.

On this basis, when network slice information is carried in the AS, GUTI information is not carried in the AS; or, when GUTI information is carried in the AS, network slice information is not carried in the AS. That is, only one of the requested network slice information or the GUTI information is carried in the AS.

In the art, when S-NSSAI and GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

With regard to the manner in which the first network element on the network side selects the core network element based on the network slice information, it may be determined which core network element is to be selected according to which core network element supports the corresponding S-NASSI. With regard to the network slice supported by each core network element, it may be informed to the first network element by the core network element, or, it may also be acquired from the core network element by the first network element, which will not be described here in detail.

With regard to the manner in which the first network element on the network side selects the core network element based on at least part of the GUTI information, it may be directly determining which core network element is to be selected according to the information contained in the GUTI. The composition of the GUTI can be illustrated in FIG. 10, which shows 4G-GUTI and 5G-GUTI. For example, for the core network EPC in 4G, the GUTI is composed of a globally unique MME identifier and an M-TMSI, and the globally unique MME identifier is composed of an MCC, an MNC, an MME group ID and an MME code. Then the first network element is capable of determining the core network element to be selected, according to the content included in the GUTI. Moreover, for the core network 5GC in 5G, the 5G-GUTI may be composed of an MMC, an MNC, an AMF area ID, an AMF Set ID, an AMF pointer and 5G-TMSI, and the first network element is capable of determining the core network element to be selected, according to the composition content of the GUTI.

Based on the above, the following describes multiple scenarios provided in this embodiment in combination with the drawings.

Scenario 1

The request message initiated to the network side includes at least one of: registration update request message, initial registration request message, attach request message, or location update message. Herein, initiating the request message to the network side further includes: initiating, to the first network element, a routing NAS message or an N2 message.

Part or all of information that is based on the GUTI of the second network element is carried in the AS, and at least one of the following is used in the NAS: part or all of information of a GUTI of the first network element, or part or all of information of the GUTI or SUbscription Permanent Identifier (SUFI) information mapped from the GUTI of the first network element and used on the second network element.

For instance, as illustrated in FIG. 2, in an operation 3 of the Scenario 1, in the request message initiated to the network side (RAN) from the UE, the (at least part of) GUTI including the information of the network element-2 is added into the AS, but the (at least part of) GUTI including the information of the network element-1 is still used in the NAS.

Then, in the operations 4 and 5 of the Scenario 1, the RAN routes the request message to the correct network element-2 based on the GUTI information of the AS. And the RAN transmits the request message to the network element-2, then according to the GUTI of the NAS, the network element-2 finds the network element-1 to perform the remaining registration request process.

Scenario 2

In this scenario, the request message includes: part or all of GUTI information of the first network element, which is contained in both the AS and the NAS.

For instance, as illustrated in FIG. 2, in an operation 3 of the Scenario 2, the normal request message is transmitted to the network side by the UE. That is, the same GUTI information (the GUTI information of the network element-1) is included in both the AS and the NAS. And the RAN transmits this message to the network element-1.

2a of Scenario 2

In operations 4a and 5a, the network element-1 provides the information of the network element-2 (that is, the second network element) to the RAN, and performs an indirect redirection. Then, with the information of the network element-2 being carried, the RAN transmits the request message to the network element-2. After that, the remaining registration request process is performed.

2b of Scenario 2

In operations 4b and 5b, the network element-1 directly transmits the message to the network element-2, which specifically transmits the request message and other necessary additional messages to the network element-2. Then, the network element-2 notifies the RAN of a change of tunnel endpoint(s), and performs the subsequent registration process.

Scenario 3 is directed to a manner in which the UE does not need to be triggered by the network side but initiates an indication to the network side by itself. For example, as illustrated in FIG. 15, the UE transmits a first message (including the information of the AS and the NAS) to the network-side RAN.

The GUTI corresponding to the first network element is included in the AS, and the GUTI corresponding to the second network element is included in the NAS.

Or, indication information is included in the AS, which instructs the RAN to use at least one of the requested network slice information or the GUTI information, so as to determine the routing core network element, and transmit the NAS information to the core network element.

Figure 15:
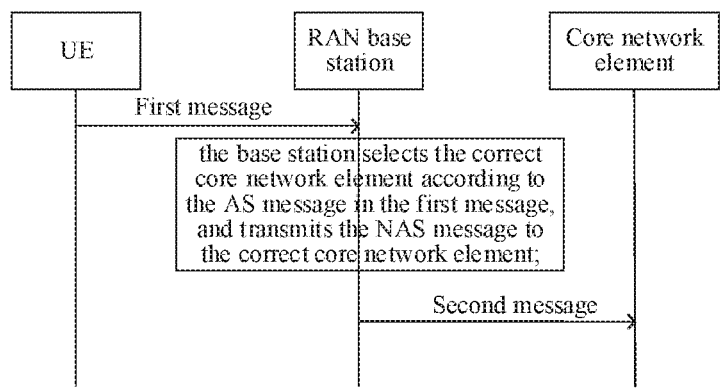
FIG. 15 is a schematic diagram of a first scenario according to an embodiment of the disclosure.

Based on what is shown in FIG. 15, the base station selects the correct core network element according to the AS message in the first message, and transmits the NAS message to the correct core network element. In addition, as illustrated in the figure, the RAN base station may transmit the second message (which carries the transmitted NAS message) to the core network element.

It should also be noted that, in this scenario, the UE itself triggers the trigger condition for transmission of the indication to the network-side RAN, and the indication may be transmitted based on the configuration of the UE, for example, when the timing duration of a current timer of the UE reaches a threshold value, etc., which will not be described here in detail.

Figure 16:
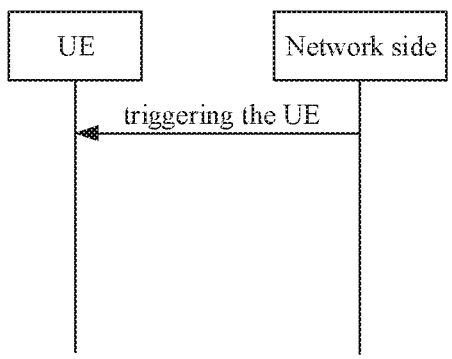
FIG. 16 is a schematic diagram of a second scenario according to an embodiment of the disclosure.

Scenario 4 is directed to a manner in which the UE triggered by the network side, such that the UE initiates a request to the network side. For instance, as illustrated in FIG. 16, the network side may trigger the UE to start transmitting the request message. Herein, the manner to trigger the UE may be that the network side transmits a configuration request message to the UE. Specifically, the UE receives the configuration request message from the first network element; based on the configuration request message, the UE initiates the request message to the network side.

The content contained in the configuration request message is as described above and will not be repeated here.

Therefore, by adopting, the above solutions, it is possible to hand over between the network elements corresponding to the UE based on the request information. As such, the handover between network elements may be implemented immediately without being limited by the current process of the UE (for instance, the UE is redirected). And then the processing efficiency of the UE can be improved.

Second Embodiment

Figure 3:
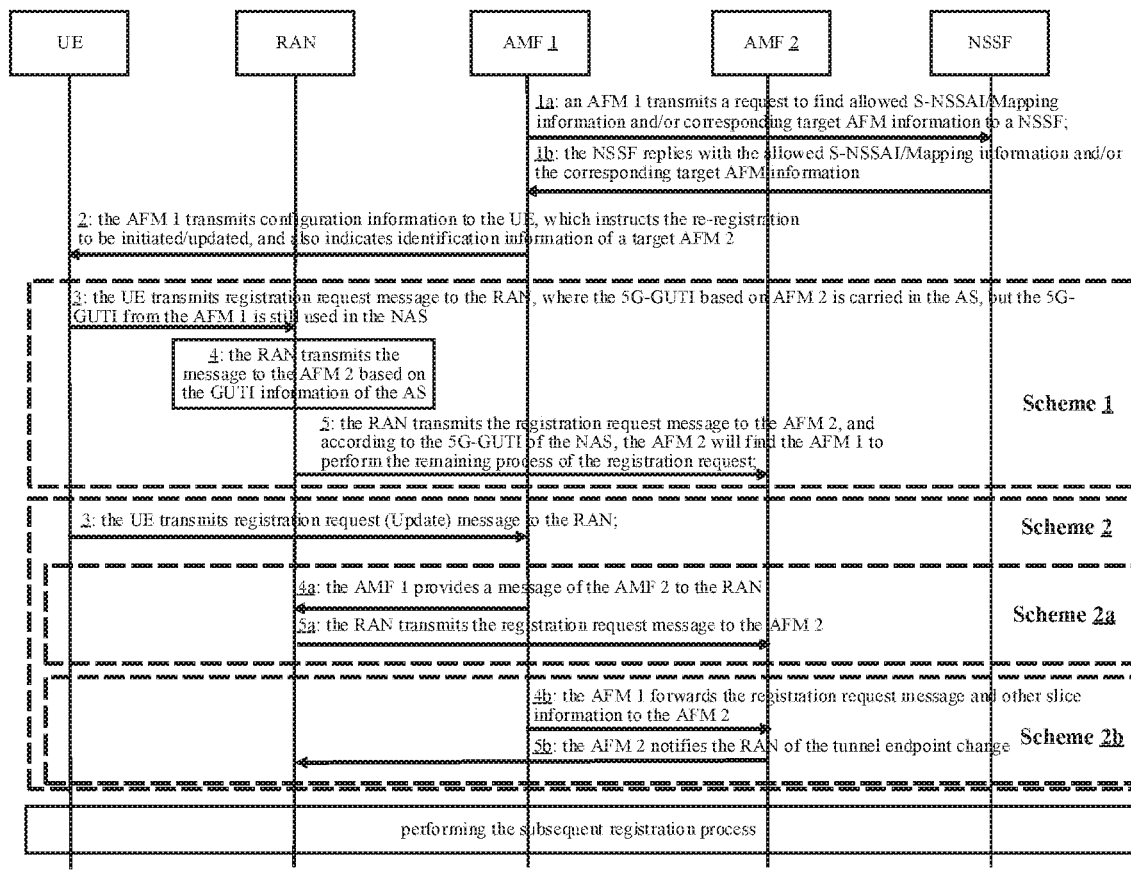
FIG. 3 is a third schematic flowchart of a method for handover between network elements according to an embodiment of the disclosure.

As illustrated in FIG. 3, the embodiment provides a specific implementation for handover between network elements, which includes the following operations.

In operations 1a and 1b, an AFM-1 (which could be understood as the first network element) searches a Network Slice Selection Function (NSSF) for allowed S-NSSAI/Mapping information and/or corresponding target AFM information. Then, the NSSF replies with the allowed S-NSSAI/Mapping information and/or the corresponding target AFM information.

In an operation 2, the AFM-1 transmits configuration information to the UE, which includes an indication of re-registration initial/update, and also includes identification information of a target AFM-2 (that is, the second network element) or identification information of the AFM-1.

Further, Scheme 1

In an operation 3, the UE transmits registration request message to the RAN, where the 5G-GUTI based on AFM-2 is carried in the AS, and the 5G-GUTI from the AFM-1 is still used in the NAS.

In operations 4 and 5, the RAN transmits the message to the AFM-2 based on the 5G-GUTI of the AS, Then, the RAN transmits the registration request message to the AFM-2, and according to the 5G-GUTI of the NAS, the network element-2 finds the network element-1 to perform the remaining registration request process.

Scheme 2

In the operation 3, the UE transmits the registration request (update) message to the AMF-1; that is, the UE transmits a registration update request message to the first network element, or, the UE transmits an initial registration request message.

Accordingly, Scheme 2a

In operations 4a and 5a, the AMF-1 provides a message of the AMF-2 to the RAN; then the RAN transmits this registration request message to the AFM-2.

Scheme 2b

In operations 4a and 5a, the AFM-1 forwards the registration request message and other slice information to the AFM-2. Then, the AFM-2 notifies the RAN of a change of tunnel endpoint(s), and performs the subsequent registration process.

It should be further explained that a 5G network slice is an important 5G function. In order to ensure that different UEs may access different network slices, NSSAI is introduced, and different NSSAI for different UEs is provided by the network. Herein, only one piece of NSSAI is configured on one UE, where one piece of NSSAI includes one or more pieces of Single-NSSAI (S-NSSAI), and each piece of S-NSSAI corresponds to a network slice.

Figure 4:
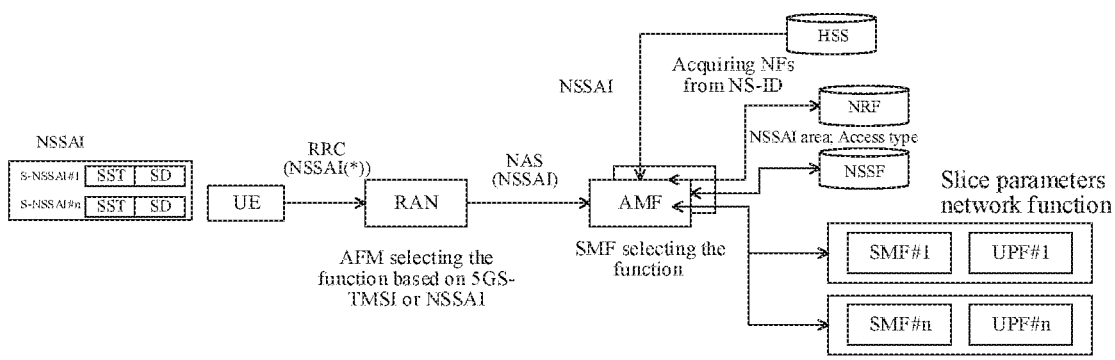
FIG. 4 is a fourth schematic flowchart of a method for handover between network elements according to an embodiment of the disclosure.

In a 5G network, as illustrated in FIG. 4, the UE needs to register to the 5G network through the registration process firstly, and then the UE is capable of performing relevant 5G services. Through the Registration Request message, the UE transmits the requested S-NSSAI to the RAN and the AFM, then the AMF transmits the S-NSSAI to the NSSF in order to acquire the Allowed S-NSSAI, after that, the AFM returns the Allowed S-NSSAI to the UE through a Registration Accept message. The UE subsequently carries the S-NSSAI (one of multiple pieces of Allowed NSSAI) in a Protocol Data Unit (PDU) session request message, and the network-side AMF transmits, according to the S-NSSAI carried by the UE, a request to query the NSSF for the corresponding NSI-ID (Network Slice Instance-ID). Then the AFM transmits the NSI-ID returned from NSSF to the Repository Function (NRF). And the NRF returns corresponding Session Management Function (SMF) information to the AMF, so that the AMF finds a corresponding SMF network element according to the SMF information and then generates a corresponding PDU session.

The NSSAI is divided into the following three types.

Requested S-NSSAI: it is transmitted in the UE registration request message and the information is used for indicating which S-NSSAI the UE applies for. At the same time, the RAN can also transmit, according to the information, the NAS message of the UE to a specific AMF (which supports the requested S-NSSAI);

Subscribed NSSAI: this is the NSSAI that the network side subscribes for the user. When the user's NSSAI subscription information changes, a Unified Data Management (UDM) will notify the AMF to trigger the AMF to update the NSSAI configuration for the UE (FIG. 4 below will introduce the configuration update process, that is, UE Configuration Update (UCU)).

Allowed NSSAI: the AMF may determine which are allowed to be used according to the Allowed S-NSSAI required by the UE in the registration request message. And the Allowed NSSAI will be sent back to the UE in a Registration accept message. The UE subsequently carries S-NSSAI of the Allowed NSSAI in the PDU session establishment request message to establish the corresponding PDU session.

Figure 5:
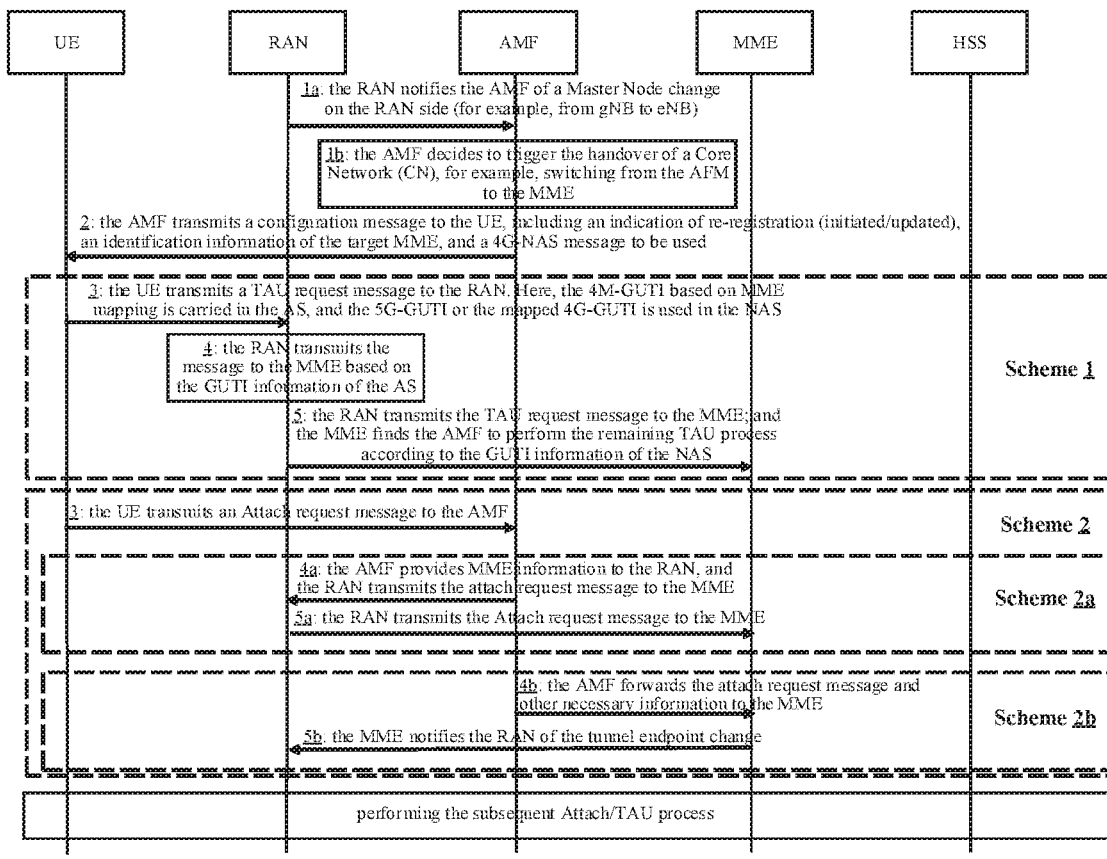
FIG. 5 is a first schematic flowchart of a network processing according to an embodiment of the disclosure.

As illustrated in FIG. 5, this embodiment provides a specific implementation for handover between network elements, which includes the following operations.

In operations 1a and 1b, the RAN notifies the AMF of a Master Node change on the RAN side (for example, from gNB to eNB). Then the AMF decides to trigger the handover of a Core Network (CN), for example, handover from the AFM to the MME. Herein, the AMF can be understood as the first network element, and the MME can be understood as the second network element.

In an operation 2, the AMF transmits a configuration message to the UE, including an indication of re-registration (initial/update), an identification information of the target MME, and a 4G-NAS message to be used.

Scheme 1

In an operation 3, the UE transmits a TAU request message to the RAN. Herein, the mapped 4G-GUTI based on MME is carried in the AS, and the 5G-GUTI or the mapped 4G-GUTI is used in the NAS.

In operations 4 and 5, the RAN transmits this message to the MME based on the GUTI of the AS. Herein, the RAN transmits the TAU request message to the MME, and the MME finds, according to the GUTI information of the NAS, the AMF to perform the remaining TAU process.

Scheme 2

In an operation 3, the UE transmits an attach request message to the AMF.

Scheme 2a

In operations 4a and 5a, the AMF provides MME information to the RAN, and the RAN transmits the attach request message to the MME.

Scheme 2b

In operations 4b and 5b, the AMF forwards the attach request message and other necessary information to the MME. Then the MME notifies the RAN of a change of tunnel endpoint(s) and performs the subsequent attach TAU process.

Figure 6:
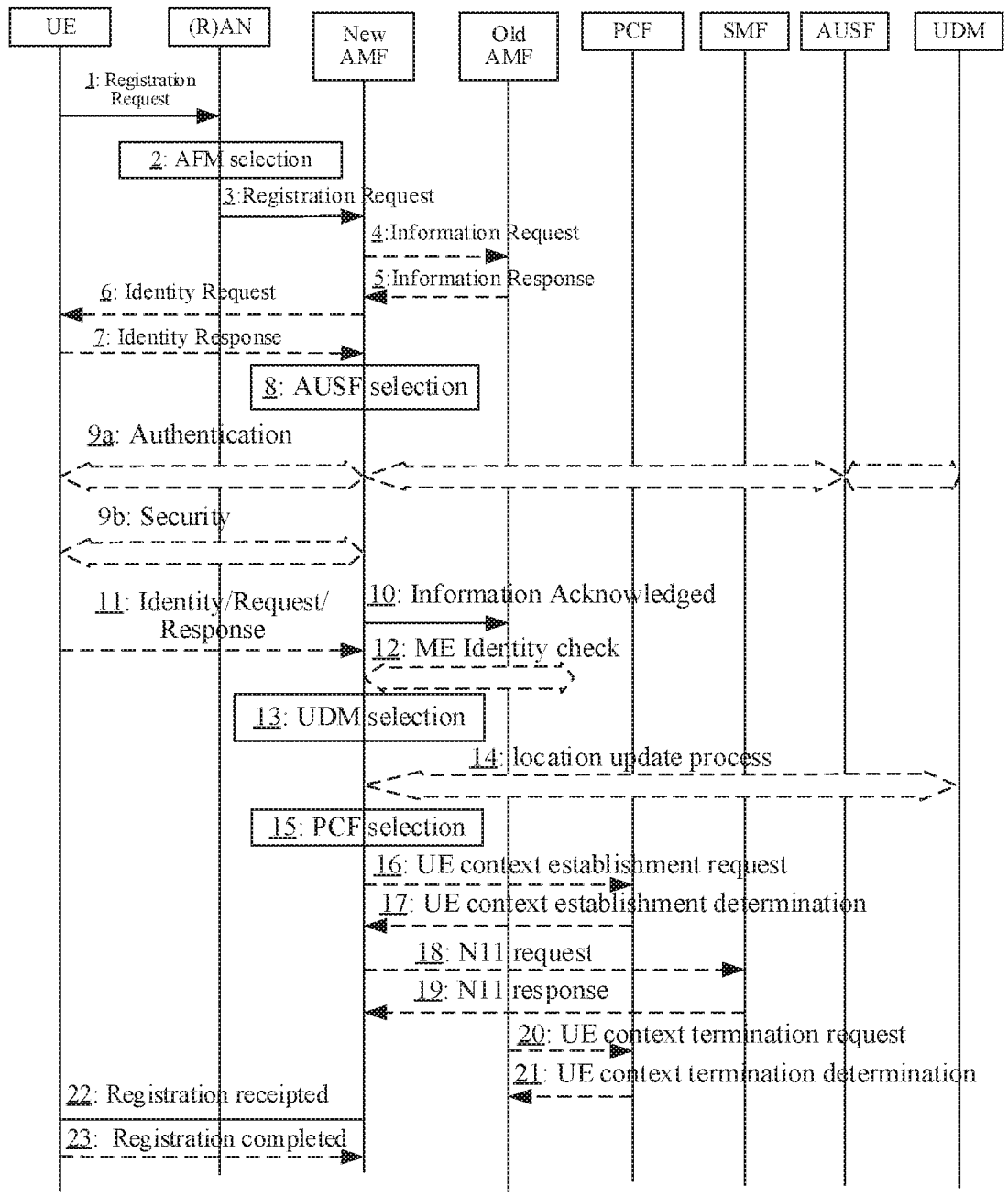
FIG. 6 is a second schematic flowchart of a network processing according to an embodiment of the disclosure.

With regard to the registration process shown in FIG. 6, the Registration request message will contain the requested S-NSSAI, and Registration Type (which is equal to Initial/Update/Emergency). After receiving the Registration request message by the RAN, the RAN node can determine, according to the requested S-NSSAI, to which AMF the NAS message of the UE is transmitted.

Figure 7:
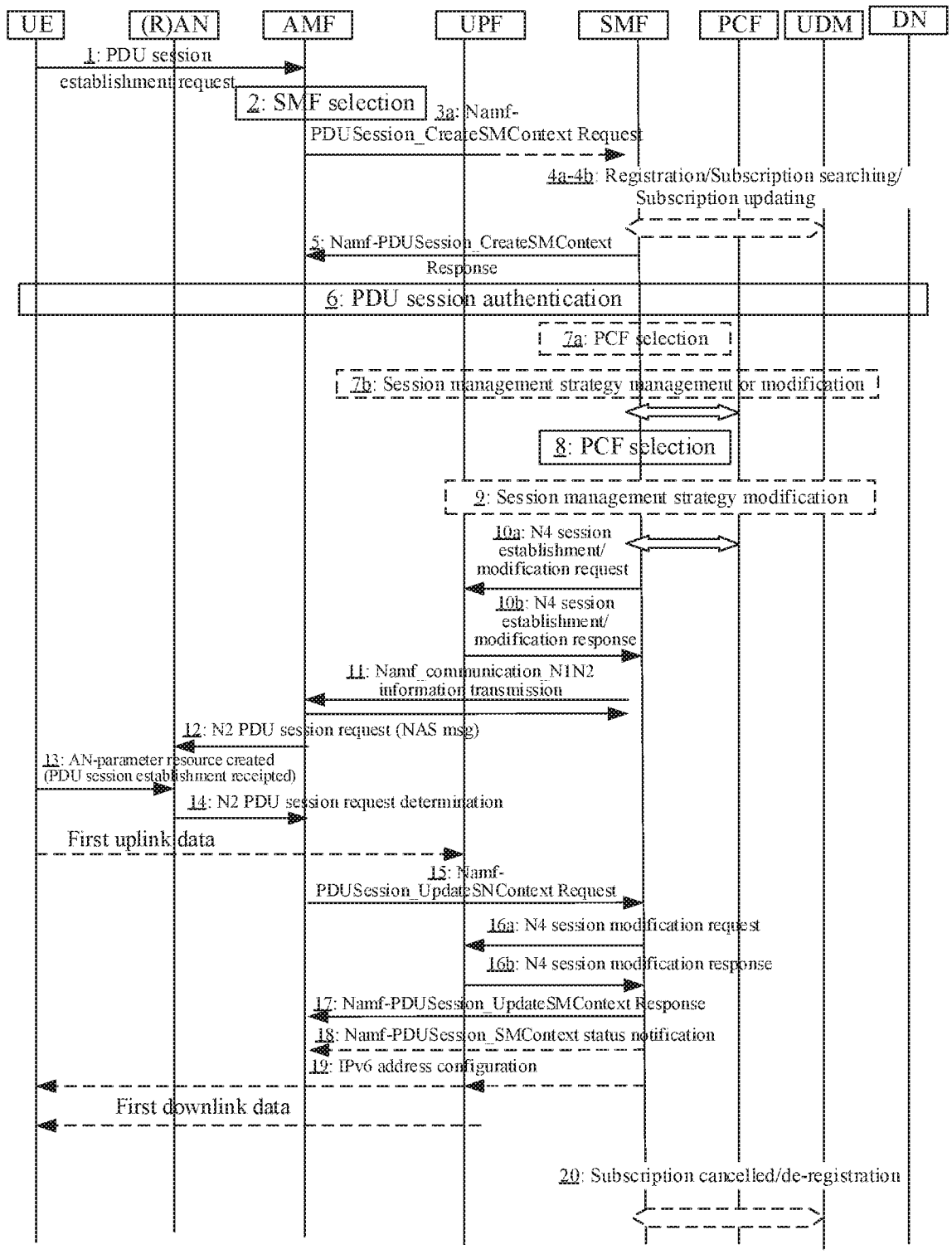
FIG. 7 is a third schematic flowchart of a network processing according to an embodiment of the disclosure.
Figure 8:
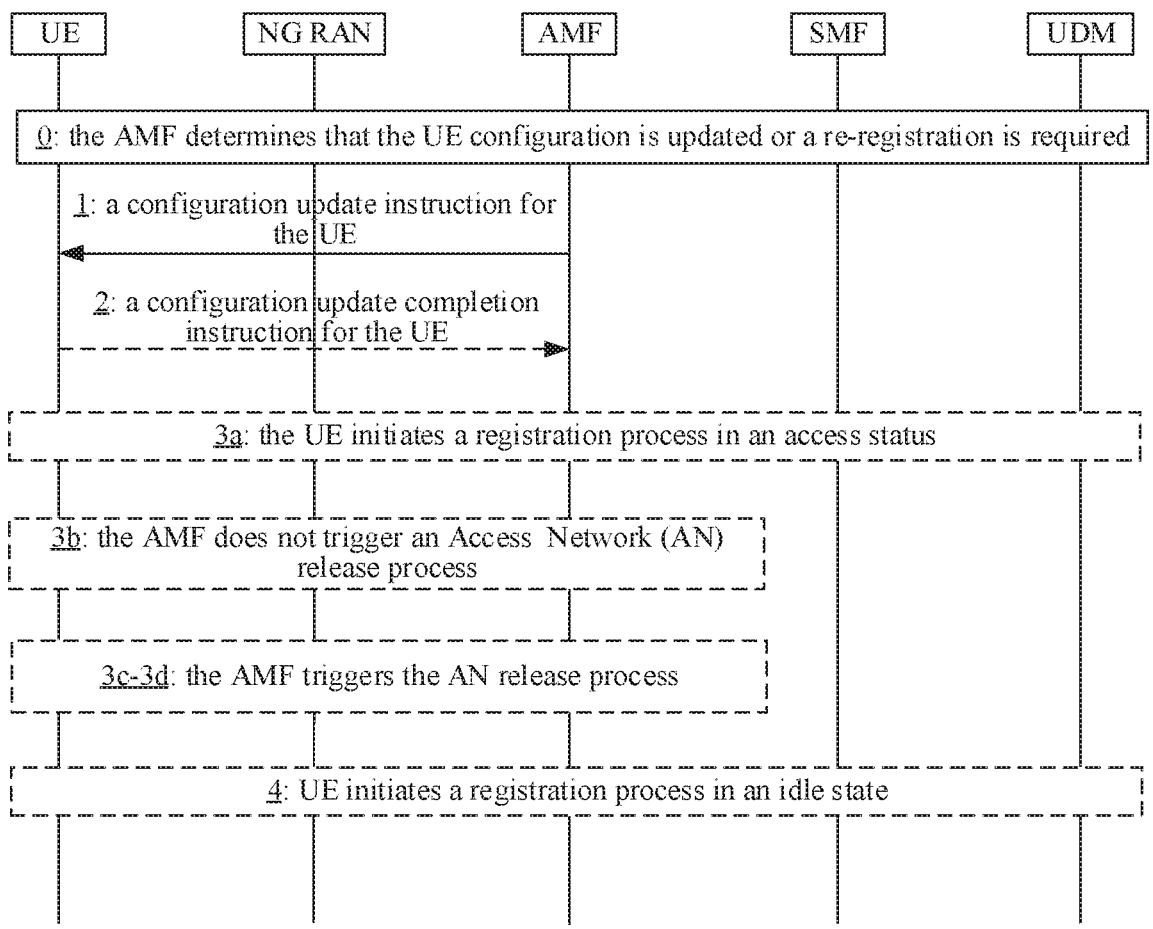
FIG. 8 is a fourth schematic flowchart of a network processing according to an embodiment of the disclosure.

FIG. 7 and FIG. 8 respectively show the PDU Session establishment process for the UE and the UE configuration process.

In FIG. 7, in the first step, the UE reports S-NSSAI, DNN, Access Type, PDU Session ID, etc. to the network side. And the network establishes the required PDU session for the UE.

FIG. 8 shows the following.

In an operation 0, the AMF determines that the UE configuration is to be updated or a re-registration is required.

In an operation 1, the AMF transmits a configuration update instruction to the UE.

In operations 2-4, the UE transmits the configuration update completion to the AMF; then the UE can initialize the registration process; the AMF does not trigger the Access Network (AN) release process; or, the AMF triggers an AN release process. Thereafter, the UE initializes the registration process.

Figure 9:
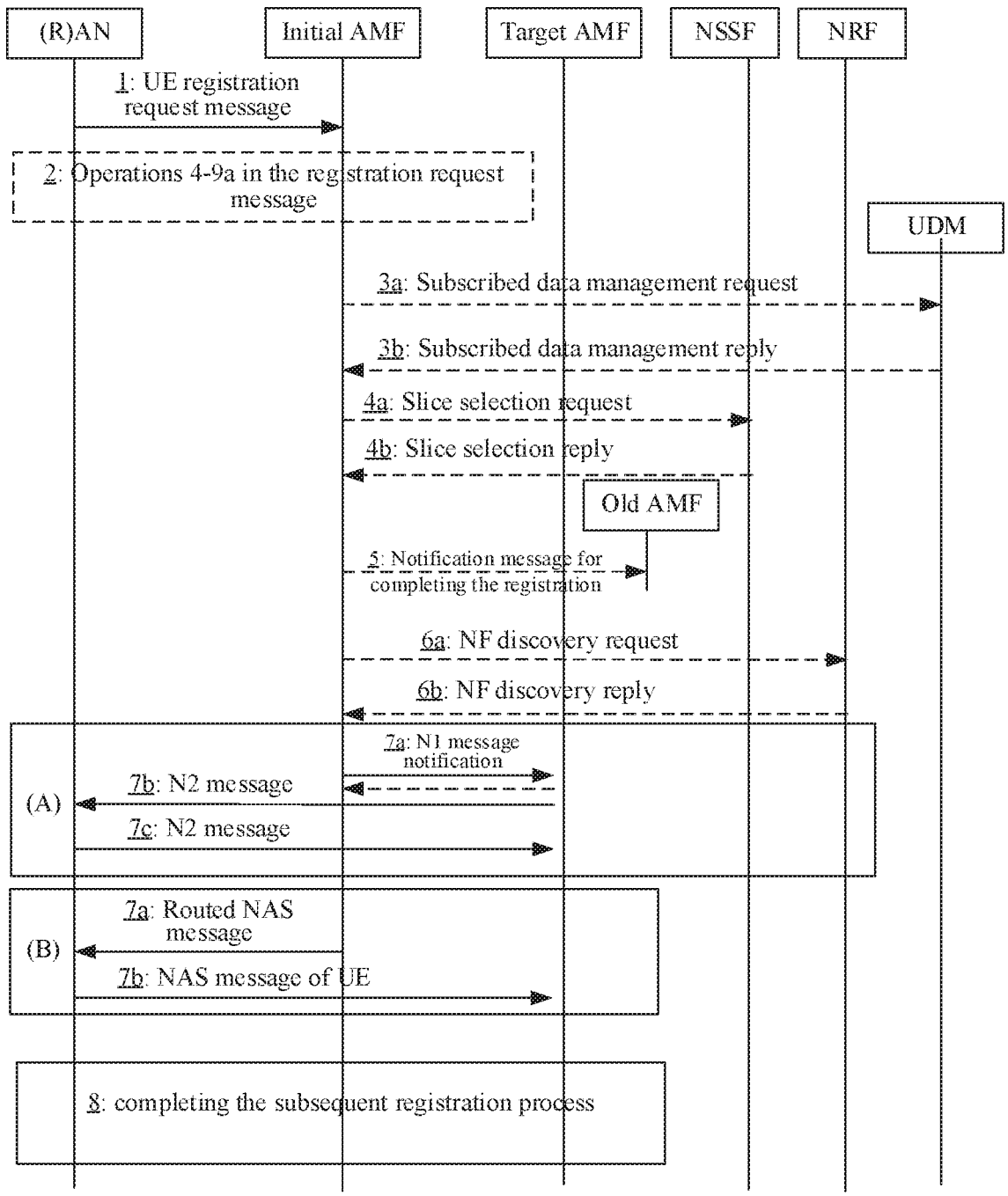
FIG. 9 is a fifth schematic flowchart of a network processing according to an embodiment of the disclosure.

As illustrated in FIG. 9, based on the AMF Reallocation process of the AMF redirection, after the Initial AMF receives the NAS message, it triggers the redirection process to redirect the NAS message of the UE to a Target AMF, that is, let another AMF serve the UE.

Figure 10:
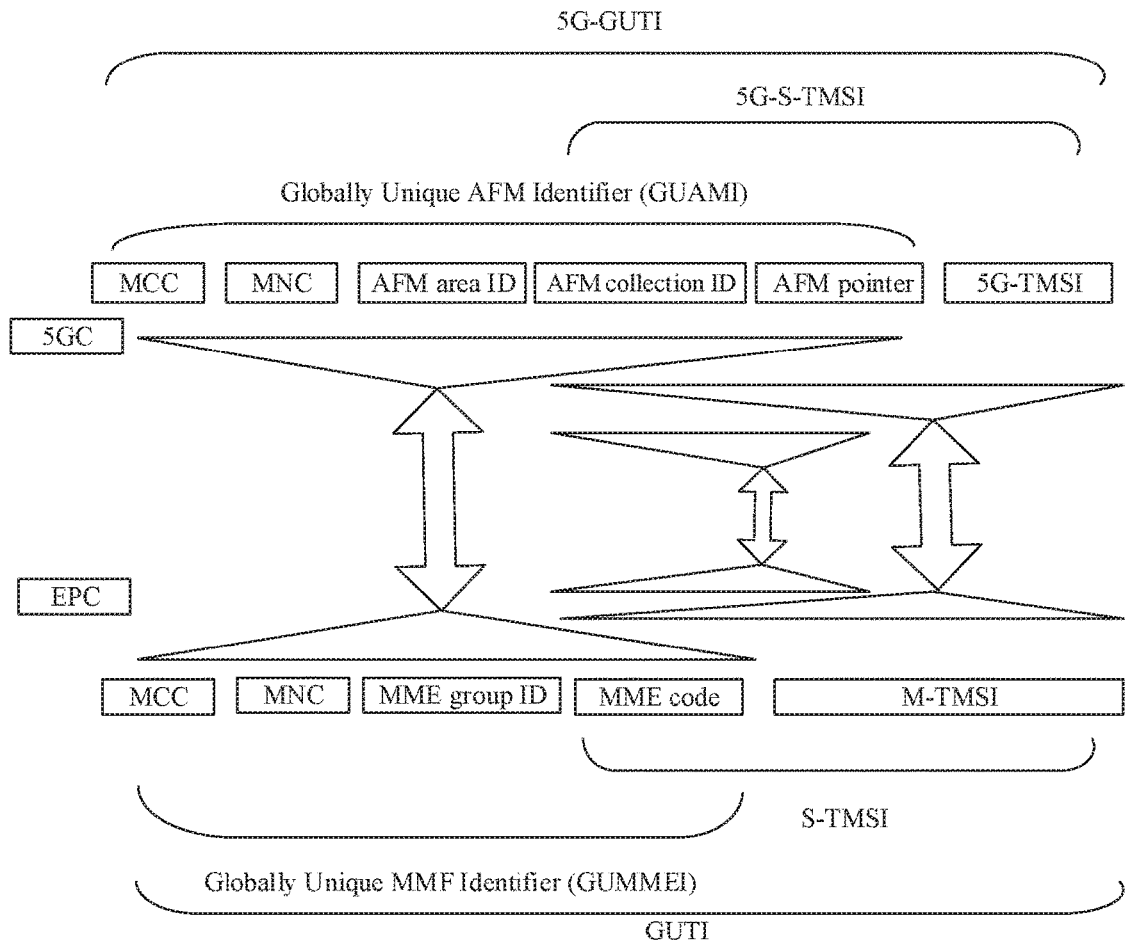
FIG. 10 is a schematic diagram of handover between network elements according to an embodiment of the disclosure.

Currently, there are three methods for handover between the AMF network elements, which are determined by the RAN during the registration process. The original AMF triggers a redirection to the target AMF after receiving the NAS message, where 5G GUTI and 4G GUTI are shown in FIG. 10.

Third Embodiment

Figure 11:
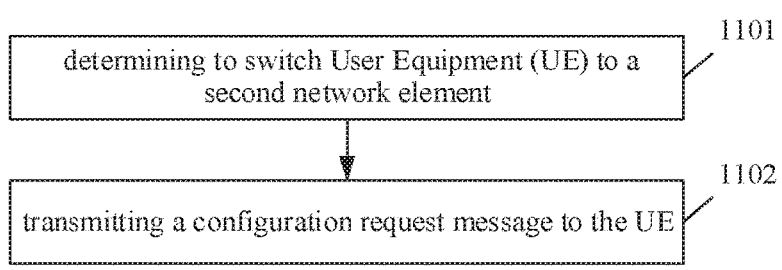
FIG. 11 is a fifth schematic flowchart of a method for handover between network elements according to an embodiment of the disclosure.
Figure 12:
FIG. 12 is a first schematic structural diagram of a network element according to an embodiment of the disclosure.

The embodiment of the disclosure provides a method for handover between network elements, applied to the first network element. As illustrated in FIG. 11, the method includes the following operations.

In an operation 1101, it is determined to hand over the UE to the second network element.

In an operation 1102, a configuration request message is transmitted to the UE.

The configuration request message comprises at least one of: registration type, identification information of the second network element, an indication of a GUTI required to be used by the AS, NAS type used, message type used. Herein, the GUTI required to be used by the AS includes at least part of information of a GUTI corresponding to the second network element. Herein, the registration type includes one of: initial registration, registration update, or emergency registration. Herein, the NAS type includes 5GC-NAS or EPC-NAS.

For example, as illustrated in FIG. 2, the first network element is assumed to be a network element-1 in the figure.

In operations 1 and 2, when the network element 1 decides to hand over the UE to another network element, the network element 1 (which can specifically be the AMF) transmits the configuration request message. And the configuration request message may include the following items: 1) request message type (Initial/Update/Emergency); 2) an indication of identification information of a target network element-2, or an indication of a GUTI required to be used by the AS (including the information of the target network element-2, instead of the information of the network element-1); 3) NAS type (5GC-NAS or EPC-NAS); 4) information used to find the AMF/MMF. In this embodiment, the content of the AS and the NAS may be illustrated in FIG. 14. Herein, parameters of the AS may include a GUTI-1, such as the information of the first network element; parameters of the NAS may include a GUTI-1, such as the information of the second network element.

Accordingly, if item 1) is included, then when the AMF initiates the request message, the type (Update/Initial/Emergency or any other type) of this request message is indicated.

If item 2) is included, in the Registration request message transmitted by the UE, a GUTI pointing to the network element-2 is added and included in the AS, and a GUTI pointing to the network element-1 is still included in the NAS.

If item 3) is included, the UE uses a 4G-NAS message or a 5G-NAS message according to the indication; if there is an indication of 4G-NAS, the UE needs to map the 5G-GUTI into 4G-GUTI or use an International Mobile Subscriber Identity (IMSI), and transmits a 4G-type message (e.g. Attach request/TAU Request).

If item 4) is included, in the transmitted message, UE will instruct the RAN side to determine the routing core network element according to specified information. Then, a NAS message will be transmitted to a specified core network element, and the specified information includes network slice information or GUTI information of AS.

In the art, when S-NSSAI and GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

With regard to the manner in which the first network element on the network side selects the core network element based on the network slice information, it may be determined which core network element is to be selected according to which core network element supports the corresponding S-NASSI. With regard to the network slice supported by each core network element, it may be informed to the first network element by the core network element, or, it may also be acquired from the core network element by the first network element, which will not be described here in detail.

With regard to the manner in which the first network element on the network side selects the core network element based on at least part of the GUTI information, it may be directly determining which core network element is to be selected according to the information contained in the GUTI. The composition of the GUTI can be illustrated in FIG. 10, which shows 4G-GUTI and 5G-GUTI. For example, for the core network EPC in 4G, the GUTI is composed of a globally unique MME identifier and an M-TMSI, and the globally unique MME identifier is composed of an MCC, an MNC, an MME group ID and an MME code. Then the first network element is capable of determining the core network element to be selected, according to the content included in the GUTI. Moreover, for the core network 5GC in 5G, the 5G-GUTI may be composed of an MMC, an MNC, air AMF area ID, an AMF Set ID, an AMF pointer and 5G-TMSI, and the first network element is capable of determining the core network element to be selected, according to the composition content of the GUTI.

Based on the above, the following describes multiple scenarios provided in this embodiment in combination with the drawings:

Scenario 1

The UE side transmits a registration request, an attachment request, or a location update message to the network side. Part or all of the information that is based on the GUTI of the second network element is carried in the AS, and one of the following is used in the NAS: part or all of information of a GUTI of the first network element, or part or all of information of the GUTI or SUPI information mapped from the GUTI of the first network element and used on the second network element.

Correspondingly, for the processing on the network side, the method further includes the following.

The registration request message from the UE is received. Part or all of the information that is based on the GUTI of the second network element is carried in the AS, and one of the following is used in the NAS: part or all of information of a GUTI of the first network element, or part or all of information of the GUTI or SUPI information mapped from the GUTI of the first network element and used on the second network element.

The network side routes to the second network element for processing, according to the part or all of the information that is in the AS and based on the GUTI of the second network element.

Or, the first request message from the UE is received, and part or all of the information that is based on the GUTI of the second network element is carried in both the AS and the NAS.

The network side routes to the second network element for processing, according to the part or all of the information that is in the AS and based on the GUTI of the second network element.

The first request message may be a TAU request message.

For instance, in an operation 3 of the Scenario 1, in the request message initiated to the network side (RAN) from the UE, the (at least part of) GUTI including the information of the network element-2 is added into the AS, but the (at least part of) GUTI including the information of the network element-1 is still used in the NAS.

Then, in the operations 4 and 5 of the Scenario 1, the RAN routes the request message to the correct network element-2 based on the GUTI information of the AS, And the RAN transmits the request message to the network element-2, then according to the GUTI of the NAS, the network element-2 finds the network element-1 to perform the remaining registration request process.

Scenario 2

In this scenario, the request message includes: part or all of GUTI information of the first network element, which is contained in both the AS and the NAS.

Correspondingly, the method further includes:

receiving a request message from the UE. Herein, the request message includes at least the information of the second network element carried in the AS. Then, the message of the second network element is provided to the third network element, such that the third network element may transmit the request message to the second network element.

For instance, as illustrated in FIG. 2, in an operation 3 of the Scenario 2, the normal request message is transmitted to the network side by the UE. That is, the same GUTI information (the GUTI information of the network element-1) is included in both the AS and the NAS. And the RAN transmits this message to the network element-1.

2a of Scenario 2.

A request message from the UE is received. Herein, the request message includes at least the information of the second network element carried in the AS. Then, the message of the second network element is provided to the third network element, such that the third network element may transmit the request message to the second network element.

For example, as illustrated in FIG. 2, in the operations 4a and 5a, the network element-1 provides the information of the network element-2 (that is, the second network element) to the RAN, and performs an indirect redirection. Then, with the information of the network element-2 being carried, the RAN transmits the request message to the network element-2. After that, the remaining registration request process is performed.

In 2b of Scenario 2, a request message from the UE is received. Herein, the request message is forwarded to the second network element, such that the second network element notifies the third network element to change the tunnel endpoint.

For example, in operations 4b and 5b, the network element-1 directly transmits the message to the network element-2, which specifically transmits the request message and other necessary additional messages to the network element-2. Then, the network element-2 notifies the RAN of a change of tunnel endpoint(s), and performs the subsequent registration process.

Scenario 3 is directed to a manner in which the UE does not need to be triggered by the network side but initiates an indication to the network side by itself. For example, as illustrated in FIG. 15, the UE transmits a first message (including the information of the AS and the NAS) to the network-side RAN.

The GUTI corresponding to the first network element is included in the AS, and the GUTI corresponding to the second network element is included in the NAS.

Or, indication information is included in the AS, which instructs the RAN to use at least one of the requested network slice information or the GUTI information, so as to determine the routing core network element, and transmit the NAS information to the core network element.

Based on what is shown in FIG. 15, the base station selects the correct core network element according to the AS message in the first message, and transmits the NAS message to the correct core network element. In addition, as illustrated in the figure, the RAN base station may transmit the second message (which carries the transmitted NAS message) to the core network element.

It should also be noted that, in this scenario, the UE itself triggers the trigger condition for transmission of the indication to the network-side RAN, and the indication may be transmitted based on the configuration of the UE, for example, when the timing duration of a current timer of the UE reaches a threshold value, etc., which will not be described here in detail.

Scenario 4 is directed to a manner in which the UE is triggered by the network side, such that the UE initiates a request to the network side. For instance, as illustrated in FIG. 16, the network side may trigger the UE to start transmitting the request message. Herein, the manner to trigger the UE may be that the network side transmits a configuration request message to the UE. Specifically, the UE receives the configuration request message from the first network element; based on the configuration request message, the UE initiates the request message to the network side.

The content contained in the configuration request message is as described above and will not be repeated here.

Therefore, by adopting the above solutions, it is possible to hand over between the network elements corresponding to the UE based on the request information. As such, the handover between network elements may be implemented immediately without being limited by the current process of the UE (for instance, the UE is redirected). And then the processing efficiency of the UE can be improved.

Fourth Embodiment

The embodiment of the disclosure provides User Equipment (UE), including a first communication unit.

The first communication unit is configured to initiate a request message to a network side, where the request message comprises information of a second network element, which is carried in an AS, so that the network side is capable of transmitting the request message to a corresponding network element according to the information of the second network element; the request message further comprises at least one of: information of a first network element or the information of the second network element, which is carried in a NAS.

The first communication unit is further configured to receive the configuration request message from the first network element.

The configuration request message comprises at least one of: registration type, identification information of the second network element, an indication of a GUTI required to be used by the AS, NAS type used, message type used. Herein, the GUTI required to be used by the AS includes at least part of information of a GUTI corresponding to the second network element. Herein, the registration type includes one of: initial registration, registration update, or emergency registration. Herein, the NAS type includes 5GC-NAS or EPC-NAS.

Herein, the first network element is a RAN base station.

For example, as illustrated in FIG. 2, the first network element is assumed to be a network element-1 in the figure.

In operations 1 and 2, when the network element 1 decides to hand over the UE to another network element, the network element 1 (which can specifically be the AMF) transmits the configuration request message. And the configuration request message may include the following items: 1) request message type (Initial/Update/Emergency); 2) an indication of identification information of a target network element-2, or an indication of a GUTI required to be used by the AS (including the information of the target network element-2, instead of the information of the network element-1); 3) NAS type (5GC-NAS or EPC-NAS); 4) information used to find the AMF/MMF.

Accordingly, if item 1) is included, then when the AMF initiates the request message, the type (Update/Initial/Emergency or any other type) of this request message is indicated.

If item 2) is included, in the Registration request message transmitted by the UE, a GUTI pointing to the network element-2 is added and included in the AS, and a GUTI pointing to the network element-1 is still included in the NAS.

If item 3) is included, the UE uses a 4G-NAS message or a 5G-NAS message according to the indication; if there is an indication of 4G-NAS, the UE needs to map the 5G-GUTI into 4G-GUTI or use an International Mobile Subscriber Identity (IMSI), and transmits a 4G-type message (e.g. Attach request/TAU Request).

If item 4) is included, first indication information is carried in the AS to instruct the RAN base station to select a core network element according to at least one of requested network slice information or GUTI information. Specifically, in the message transmitted by the UE, it is indicated that the RAN side determines a routing core network element according to specified information, and then transmits the NAS message to a specified core network element, where the specified information includes network slice information or GUTI information of AS.

On this basis, when network slice information is carried in the AS, GUTI information is not carried in the AS; or, when GUTI information is carried in the AS, network slice information is not carried in the AS. That is, only one of the requested network slice information or the GUTI information is carried in the AS.

In the art, when S-NSSAI and GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

With regard to the manner in which the first network element on the network side selects the core network element based on the network slice information, it may be determined which core network element is to be selected according to which core network element supports the corresponding S-NASSI. With regard to the network slice supported by each core network element, it may be informed to the first network element by the core network element, or, it may also be acquired from the core network element by the first network element, which will not be described here in detail.

With regard to the manner in which the first network element on the network side selects the core network element based on at least part of the GUTI information, it may be directly determining which core network element is to be selected according to the information contained in the GUTI. The composition of the GUTI can be illustrated in FIG. 10, which shows 4G-GUTI and 5G-GUTI. For example, for the core network EPC in 4G, the GUTI is composed of a globally unique MME identifier and an M-TMSI, and the globally unique MME identifier is composed of an MCC, an MNC, an MME group ID and an MME code. Then the first network element is capable of determining the core network element to be selected, according to the content included in the GUTI. Moreover, for the core network 5GC in 5G, the 5G-GUTI may be composed of an MMC, an MNC, an AMF area ID, an AMF Set ID, an AMF pointer and 5G-TMSI, and the first network element is capable of determining the core network element to be selected, according to the composition content of the GUTI.

Based on the above, the following describes multiple scenarios provided in this embodiment in combination with the drawings:

Scenario 1

The first communication unit initiates the request message to the network side, where the request message includes at least one of: registration update request message, initial registration request message, attach request message, or location update message. Herein, initialing the request message to the network side further includes: initiating, to the first network element, a routing NAS message or an N2 message.

The registration request, the attachment request, or the location update message may be transmitted to the network side. Part or all of the information that is based on the GUTI of the second network element is carried in the AS, and one of the following is used in the NAS: part or all of information of a GUTI of the first network element, or part or all of information of the GUTI or SUN information mapped from the GUTI of the first network element and used on the second network element.

For instance, in an operation 3 of the Scenario 1, in the request message initiated to the network side (RAN) from the UE, the (at least part of) GUTI including the information of the network element-2 is added into the AS, but the (at least part of) GUTI including the information of the network element-1 is still used in the NAS.

Then, in the operations 4 and 5 of the Scenario 1, the RAN routes the request message to the correct network element-2 based on the GUTI information of the AS. And the RAN transmits the request message to the network element-2, then according to the GUTI of the NAS, the network element-2 finds the network element-1 to perform the remaining registration request process.

Scenario 2

In this scenario, the request message includes: part or all of GUTI information of the first network element, Which is contained in both the AS and the NAS.

For instance, as illustrated in FIG. 2, in an operation 3 of the Scenario 2, the normal request message is transmitted to the network side by the UE. That is, the same GUTI information (the GUTI information of the network element-1) is included in both the AS and the NAS. And the RAN transmits this message to the network element-1.

2a of Scenario 2

In operations 4a and 5a, the network element-1 provides the information of the network element-2 (that is, the second network element) to the RAN, and performs an indirect redirection. Then, with the information of the network element-2 being carried, the RAN transmits the request message to the network element-2. After that, the remaining registration request process is performed.

2b of Scenario 2

In operations 4b and 5b, the network element-1 directly transmits the message to the network element-2, which specifically transmits the request message and other necessary additional messages to the network element-2. Then, the network element-2 notifies the RAN of a change of tunnel endpoint(s), and performs the subsequent registration process.

Scenario 3 is directed to a manner in which the UE does not need to be triggered by the network side but initiates an indication to the network side by itself. For example, as illustrated in FIG. 15, the UE transmits a first message (including the information of the AS and the NAS) to the network-side RAN.

The GUTI corresponding to the first network element is included in the AS, and the GUTI corresponding to the second network element is included in the NAS.

Or, indication information is included in the AS, which instructs the RAN to use at least one of the requested network slice information or the GUTI information, so as to determine the routing core network element, and transmit the NAS information to the core network element.

Based on what is shown in FIG. 15, the base station selects the correct core network element according to the AS message in the first message, and transmits the NAS message to the correct core network element. In addition, as illustrated in the figure, the RAN base station may transmit the second message (which carries the transmitted NAS message) to the core network element.

It should also be noted that, in this scenario, the UE itself triggers the trigger condition for transmission of the indication to the network-side RAN, and the indication may be transmitted based on the configuration of the UE, for example, when the timing duration of a current timer of the UE reaches a threshold value, etc., which will not be described here in detail.

Scenario 4 is directed to a manner in which the UE is triggered by the network side, such that the UE initiates a request to the network side. For instance, as illustrated in FIG. 16, the network side may trigger the UE to start transmitting the request message. Herein, the manner to trigger the UE may be that the network side transmits a configuration request message to the UE. Specifically, the UE receives the configuration request message from the first network element; based on the configuration request message, the UE initiates the request message to the network side.

The content contained in the configuration request message is as described above and will not be repeated here.

Therefore, by adopting the above solutions, it is possible to hand over between the network elements corresponding to the UE based on the request information. As such, the handover between network elements may be implemented immediately without being limited by the current process of the UE (for instance, the UE is redirected). And then the processing efficiency of the UE can be improved.

Fifth Embodiment

The embodiment of the disclosure provides a first network element, which includes a second processing unit and a second communication unit.

The second processing unit 1201 is configured to determine to switch the UE to the second network element.

The second communication unit 1202 is configured to transmit a configuration request message to the UE.

The configuration request message comprises at least one of: registration type, identification information of the second network element, an indication of a GUTI required to be used by the AS, NAS type used, message type used. Herein, the GUTI required to be used by the AS includes at least part of information of a GUTI corresponding to the second network element. Herein, the registration type includes one of: initial registration, registration update, or emergency registration. Herein, the NAS type includes 5GC-NAS or EPC-NAS.

For example, as illustrated in FIG. 2, the first network element is assumed to be a network element-1 in the figure.

In operations 1 and 2, when the network element 1 decides to hand over the UE to another network element, the network element 1 (which can specifically be the AMF) transmits the configuration request message. And the configuration request message may include the following items: 1) request message type (Initial/Update/Emergency); 2) an indication of identification information of a target network element-2, or an indication of a GUTI required to be used by the AS (including the information of the target network element-2, instead of the information of the network element-1); 3) NAS type (5GC-NAS or EPC-NAS); 4) information used to find the AMF/MME Accordingly, if item 1) is included, then when the AMF initiates the request message, the type (Update/Initial/Emergency or any other type) of this request message is indicated.

If item 2) is included, in the Registration request message transmitted by the UE, a GUTI pointing to the network element-2 is added and included in the AS, and a GUTI pointing to the network element-1 is still included in the NAS.

If item 3) is included, the UE uses a 4G-NAS message or a 5G-NAS message according to the indication; if there is an indication of 4G-NAS, the UE needs to map the 5G-GUTI into 4G-GUTI or use an International Mobile Subscriber Identity (IMSI), and transmits a 4G-type message (e.g. Attach request/TAU Request).

If item 4) is included, in the transmitted message, UE will instruct the RAN side to determine the routing core network element according to specified information. Then, a NAS message will be transmitted to a specified core network element, and the specified information includes network slice information or GUTI information of AS.

Based on the above, the following describes multiple scenarios provided in this embodiment in combination with the drawings:

Scenario 1

The UE side transmits a registration request, an attachment request, or a location update message to the network side. Part or all of the information that is based on the GUTI of the second network element is carried in the AS, and one of the following is used in the NAS: part or all of information of a GUTI of the first network element, or part or all of information of the GUTI or SUPI information mapped from the GUTI of the first network element and used on the second network element.

Accordingly, the second communication unit 1202 receives the registration request message from the UE. Part or all of the information that is based on the GUTI of the second network element is carried in the AS, and one of the following is used in the NAS: part or all of information of a GUTI of the first network element, or part or all of information of the GUTI or SUPI information mapped from the GUTI of the first network element and used on the second network element. The second processing unit 1201, routes to the second network element for processing, according to the part or all of the information that is based on the GUTI of the second network element.

Or, the second communication unit 1202 receives the first request message from the UE. And part or all of information that is based on the GUTI of the second network element is carried in both the AS and the NAS. Herein, the first request message may be a TAU request message.

The second processing unit 1201, routes to the second network element for processing, according to the part or all of the information that is based on the GUTI of the second network element.

For instance, in an operation 3 of the Scenario 1, in the request message initiated to the network side (RAN) from the UE, the (at least part of) GUTI including the information of the network element-2 is added into the AS, but the (at least part of) GUTI including the information of the network element-1 is still used in the NAS.

Then, in the operations 4 and 5 of the Scenario 1, the RAN routes the request message to the correct network element-2 based on the GUTI information of the AS. And the RAN transmits the request message to the network element-2, then according to the GUTI of the NAS, the network element-2 finds the network element-1 to perform the remaining registration request process.

Scenario 2

In this scenario, the request message includes: part or all of GUTI information of the first network element, which is contained in both the AS and the NAS.

Accordingly, the second communication unit 1202 receives the request message from the UE. Herein, the request message includes at least the information of the second network element carried in the AS, Then, the message of the second network element is provided to the third network element, such that the third network element may transmit the request message to the second network element.

For instance, as illustrated in FIG. 2, in an operation 3 of the Scenario 2, the normal request message is transmitted to the network side by the UE. That is, the same GUTI information (the GUTI information of the network element-1) is included in both the AS and the NAS. And the RAN transmits this message to the network element-1.

2a of Scenario 2

The second communication unit 1202 receives the request message from the UE. Herein, the request message includes at least the information of the second network element carried in the AS. Then, the message of the second network element is provided to the third network element, such that the third network element may transmit the request message to the second network element.

For example, as illustrated in FIG. 2, in the operations 4a and 5a, the network element-1 provides the information of the network element-2 (that is, the second network element) to the RAN, and performs an indirect redirection. Then, with the information of the network element-2 being carried, the RAN transmits the request message to the network element-2. After that, the remaining registration request process is performed.

2b of Scenario 2

The second communication unit 1202 receives the request message from the UE and then forwards the request message to the second network element, such that the second network element notifies the third network element to change the tunnel endpoint.

For example, as illustrated in FIG. 2, in operations 4b and 5b, the network element-1 directly transmits the message to the network element-2, which specifically transmits the request message and other necessary additional messages to the network element-2. Then, the network element-2 notifies the RAN of a change of tunnel endpoint(s), and performs the subsequent registration process.

Scenario 3 is directed to a manner in which the UE does not need to be triggered by the network side but initiates an indication to the network side by itself. For example, as illustrated in FIG. 15, the UE transmits a first message (including the information of the AS and the NAS) to the network-side RAN.

The GUTI corresponding to the first network element is included in the AS, and the GUTI corresponding to the second network element is included in the NAS.

Or, indication information is included in the AS, which instructs the RAN to use at least one of the requested network slice information or the GUTI information, so as to determine the routing core network element, and transmit the NAS information to the core network element.

Based on what is shown in FIG. 15, the base station selects the correct core network element according to the AS message in the first message, and transmits the NAS message to the correct core network element. In addition, as illustrated in the figure, the RAN base station may transmit the second message (which carries the transmitted NAS message) to the core network element.

It should also be noted that, in this scenario, the UE itself triggers the trigger condition for transmission of the indication to the network-side RAN, and the indication may be transmitted based on the configuration of the UE, for example, when the timing duration of a current timer of the UE reaches a threshold value, etc., which will not be described here in detail.

Scenario 4 is directed to a manner in which the UE is triggered by the network side, such that the UE initiates a request to the network side. For instance, as illustrated in FIG. 16, the network side may trigger the IE to start transmitting the request message. Herein, the manner to trigger the UE may be that the network side transmits a configuration request message to the UE. Specifically, the UE receives the configuration request message from the first network element; based on the configuration request message, the UE initiates the request message to the network side.

The content contained in the configuration request message is as described above and will not be repeated here.

Therefore, by adopting the above solutions, it is possible to hand over between the network elements corresponding to the UE based on the request information. As such, the handover between network elements may be implemented immediately without being limited by the current process of the UE (for instance, the UE is redirected). And then the processing efficiency of the UE can be improved.

Sixth Embodiment

The embodiment of the disclosure provides a method for network element selection, applied to the UE, which includes the following.

When the UE transmits a second message, if there is the network slice information and the GUTI information, the network slice information is carried in at least one of the AS or the NAS, but the GUTI information will not be carried. Herein, the network slice information carried in at least one of the AS or the NAS is configured to instruct the first network element to select the core network element according to this network slice information.

Or, when the UE transmits a second message, if there is the network slice information and the GUTI information, the GUTI information is carried in at least one of the AS or the NAS, but the network slice information will not be carried. Herein, the GUTI information carried in at least one of the AS or the NAS is configured to instruct the first network element to select the core network element according to this GUTI information.

Herein, the network slice information carried in at least one of the AS or the NAS allows the first network element to select the core network element according to this network slice information.

Herein, the GUTI information carried in at least one of the AS or the NAS allows the first network element to select the core network element according to this GUTI information.

That is, this embodiment is aimed at the scenario that there are the network slice information (e.g. S-NSSAI) and the GUTI information at the same time. And only one of the network slice information or the GUTI information will be transmitted.

With regard to which information is selected to be transmitted to the network side, particularly, it may be transmitted randomly; or it may be transmitted according to a preset selection rule, such as, preferred GUTI information or preferentially selected network slice information.

Herein, the second message is one of: registration request message, session setup message, session modification message, or location update message.

Herein, the first network element is an RAN base station.

For instance, when the first network element decides to hand over the UE to another network element, and the UE transmits the second message, the network slice information is carried in at least one of the AS or the NAS, but the GUTI information will not be carried. Herein, the network slice information carried in at least one of the AS or the NAS is configured to instruct the first network element to select the core network element according to this network slice information. Or, when the UE transmits a second message, the GUTI information is carried in at least one of the AS or the NAS, but the network slice information will not be carried. Herein, the GUTI information carried in at least one of the AS or the NAS is configured to instruct the first network element to select the core network element according to this GUTI information.

Further, the network slice information in this embodiment may be the requested S-NSSAI.

Specifically, in the second message transmitted by the UE, it is indicated that the routed core network element is determined according to specified information. Herein, the core network element may be selected according to one of the network slice information or GUTI information carried in at least one of the AS and the NAS.

The specific information carried by the UE in at least one of the AS or NAS, may be indicated by the network side. Specifically, the method further includes:

receiving second indication information from a network side, where the second indication information is configured to instruct the network slice information or the GUTI information to be carried in at least one of the AS or the NAS Herein, the instruction may be implemented by a designated field in the second indication information. For example, one of the bits in this information may be set as the indication field, when the specific bit is equal to 0, it can be used to indicate the network slice information to be carried, and when the specific bit is equal to 1, it can be used to indicate the GUTI information to be carried. Of course, and vice versa, the corresponding solution will not repeat here again.

That is, according to the second indication information of the network, the UE will determine the information carried in at least one of the AS or the NAS. Herein, only one of the network slice information or the GUTI information is carried in at least one of the AS or the NAS. Therefore, the provided method can minimize the security risks of privacy exposure, because of only one of the S-NSSAI or the GUTI information to be carried. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

Based on the above content, the following is further explained in combination.

The second message is initiated to the network side, where the second message is one of: registration request message, session setup message, session modification message, or location update message.

Part or all of the GUTI information is carried in at least one of the AS or the NAS, Or part or all of the requested network slice information is carried in at least one of the AS or the NAS.

Then, the first network element (e.g. the base station) may select the core network element based on the GUTI information of the AS.

It should be further explained that in order to ensure that different UEs may access different network slices, network slice information is introduced, for example in particular, Network Slicing Selection Assistant Information. In addition, different NSSAI for different UEs is provided by the network, where only one piece of NSSAI is configured on one UE. Herein, one piece of NSSAI includes one or more pieces of Single-NSSAI (S-NSSAI), and each piece of S-NSSAI corresponds to a network slice.

The requested S-NSSAI is transmitted in the UE registration request message and the information is used for indicating which S-NSSAI the UE applies for. At the same time, the RAN can also transmit, according to the information, the NAS message of the UE to a specific AMF (which supports the requested S-NSSAI).

With regard to the manner in which the first network element on the network side (for example, the RAN base station) selects the core network element based on the network slice information, it may be determined which core network element is to be selected according to which core network element supports the corresponding S-NASSI. With regard to the network slice supported by each core network element, it may be informed to the first network element by the core network element, or, it may also be acquired from the core network element by the first network element, which will not be described here in detail.

With regard to the manner in which the first network element on the network side selects the core network element based on at least part of the GUTI information, it may be directly determining which core network element is to be selected according to the information contained in the GUTI. The composition of the GUTI can be illustrated in FIG. 10, which shows 4G-GUTI and 5G-GUTI. For example, for the core network EPC in 4G, the GUTI is composed of a globally unique MME identifier and an M-TMSI, and the globally unique MME identifier is composed of an MCC, an MNC, an MME group ID and an MME code. Then the first network element is capable of determining the core network element to be selected, according to the content included in the GUTI. Moreover, for the core network 5GC in 5G, the 5G-GUTI may be composed of an MMC, an MNC, an AMF area ID, an AMF Set ID, an AMF pointer and 5G-TMSI, and the first network element is capable of determining the core network element to be selected, according to the composition content of the GUTI.

It should be finally noted that, in the art, when the S-NSSAI and the GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure.

Therefore, by adopting the above solutions, it is possible to hand over between the network elements corresponding to the UE based on the request information. As such, the handover between network elements may be implemented immediately without being limited by the current process of the UE. And then the processing efficiency of the UE can be improved.

Seventh Embodiment

The embodiment of the disclosure provides a method for network element selection, applied to the first network element, which includes the following.

When receiving the second message from the UE, it will receive the network slice information carried in at least one of the AS or the NAS, where the GUTI information are not carried. Then, the core network element may be selected according to this network slice information.

Or,

When receiving the second message from the UE, it will receive the GUTI information carried in at least one of the AS or the NAS, where the network slice information are not carried. Then, the core network element may be selected according to this GUTI information.

This embodiment is aimed at the scenario that there are the network slice information (e.g. S-NSSAI) and the GUTI information at the same time. And only one of the network slice information or the GUTI information will be transmitted.

With regard to which information is selected to be transmitted to the network side, particularly, it may be transmitted randomly, or it may be transmitted according to a preset selection rule, such as, preferred GUTI information or preferentially selected network slice information.

Herein, the second message is one of: registration request message, session setup message, session modification message, or location update message.

Herein, the first network element is an RAN base station.

For instance, when the first network element decides to hand over the UE to another network element, and the UE transmits the second message, the network slice information is carried in at least one of the AS or the NAS, but the GUTI information will not be carried. Herein, the network slice information carried in at least one of the AS or the NAS is configured to instruct the first network element to select the core network element according to this network slice information. Or, when the UE transmits a second message, the GUTI information is carried in at least one of the AS or the NAS, but the network slice information will not be carried. Herein, the GUTI information carried in at least one of the AS or the NAS is configured to instruct the first network element to select the core network element according to this GUTI information.

Further, the network slice information in this embodiment may be the requested S-NSSAI.

Specifically, in the second message transmitted by the UE, it is indicated that the routed core network element is determined according to specified information. Herein, the core network element may be selected according to one of the network slice information or GUTI information carried in at least one of the AS and the NAS.

The specific information carried by the UE in at least one of the AS or NAS, may be indicated by the network side. Specifically, the method further includes:

receiving second indication information from a network side, where the second indication information is configured to instruct the network slice information or the GUTI information to be carried in at least one of the AS or the NAS Herein, the instruction may be implemented by a designated field in the second indication information. For example, one of the bits in this information may be set as the indication field, when the specific bit is equal to 0, it can be used to indicate the network slice information to be carried, and when the specific hit is equal to 1, it can be used to indicate the GUTI information to be carried. Of course, and vice versa, the corresponding solution will not repeat here again.

That is, according to the second indication information of the network, the UE will determine the information carried in at least one of the AS or the NAS. Herein, only one of the network slice information or the GUTI information is carried in at least one of the AS or the NAS. Therefore, the provided method can minimize the security risks of privacy exposure, because of only one of the S-NSSAI or the GUTI information to be carried. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

Based on the above content, the following is further explained in combination.

The second message is initiated to the network side, where the second message is one of: registration request message, session setup message, session modification message, or location update message.

Part or all of the GUTI information is carried in at least one of the AS or the NAS. Or part or all of the requested network slice information is carried in at least one of the AS or the NAS.

Then, the first network element (e.g. the base station) may select the core network element based on the GUTI information of the AS.

It should be further explained that in order to ensure that different UEs may access different network slices, network slice information is introduced, for example in particular, Network Slicing Selection Assistant Information. In addition, different NSSAI for different UEs is provided by the network, where only one piece of NSSAI is configured on one UE. Herein, one piece of NSSAI includes one or more pieces of Single-NSSAI (S-NSSAI), and each piece of S-NSSAI corresponds to a network slice.

The requested S-NSSAI is transmitted in the UE registration request message and the information is used for indicating which S-NSSAI the UE applies for. At the same time, the RAN can also transmit, according to the information, the NAS message of the UE to a specific AMF (which supports the requested S-NSSAI).

With regard to the manner in which the first network element on the network side (for example, the RAN base station) selects the core network element based on the network slice information, it may be determined which core network element is to be selected according to which core network element supports the corresponding S-NASSI. With regard to the network slice supported by each core network element, it may be informed to the first network element by the core network element, or, it may also be acquired from the core network element by the first network element, which will not be described here in detail.

With regard to the manner in which the first network element on the network side selects the core network element based on at least part of the GUTI information, it may be directly determining which core network element is to be selected according to the information contained in the GUTI. The composition of the GUTI can be illustrated in FIG. 10, which shows 4G-GUTI and 5G-GUTI. For example, for the core network EPC in 4G, the GUTI is composed of a globally unique MME identifier and an M-TMSI, and the globally unique MME identifier is composed of an MCC, an MNC, an MME group ID and an MME code. Then the first network element is capable of determining the core network element to be selected, according to the content included in the GUTI. Moreover, for the core network 5GC in 5G, the 5G-GUTI may be composed of an MMC, an MNC, an AMF area ID, an AMF Set ID, an AMF pointer and 5G-TMSI, and the first network element is capable of determining the core network element to be selected, according to the composition content of the GUTI.

It should be finally noted that, in the art, when the S-NSSAI and the GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure.

Therefore, by adopting the above solutions, it is possible to hand over between the network elements corresponding to the UE based on the request information. As such, the handover between network elements may be implemented immediately without being limited by the current process of the UE. And then the processing efficiency of the UE can be improved.

Eighth Embodiment

The embodiment of the disclosure provides a UE, including a third communication unit.

The third communication unit is configured to: when transmitting a second message and if there are network slice information and GUTI information a third communication unit, carry the network slice information in at least one of an AS or a NAS, and not carry the GUTI information;

or, when transmitting a second message, if there is network slice information and GUTI information, carry the GUTI information in at least one of the AS or the NAS, and not carry the network slice information.

Herein, the network slice information carried in at least one of the AS or the NAS allows the first network element to select the core network element according to this network slice information.

Herein, the GUTI information carried in at least one of the AS or the NAS allows the first network element to select the core network element according to this GUTI information.

That is, this embodiment is aimed at the scenario that there are the network slice information (e.g. S-NSSAI) and the GUTI information at the same time. And only one of the network slice information or the GUTI information will be transmitted.

With regard to which information is selected to be transmitted to the network side, particularly, it may be transmitted randomly; or it may be transmitted according to a preset selection rule, such as, preferred GUTI information or preferentially selected network slice information.

The network slice information may be carried in at least one of the AS or the NAS, but the GUTI information will not be carried. Herein, the network slice information carried in at least one of the AS or the NAS is configured to instruct the first network element to select the core network element according to this network slice information.

Or, the third communication unit is configured to: when transmitting a second message, carry the GUTI information in at least one of an AS or a NAS, and not carry the network slice information. Herein, the GUTI information carried in at least one of the AS or the NAS is configured to instruct the first network element to select the core network element according to this GUTI information.

Herein, the second message is one of: registration request message, session setup message, session modification message, or location update message.

Herein, the first network element is an RAN base station.

For instance, when the first network element decides to hand over the UE to another network element, and the UE transmits the second message, the network slice information is carried in at least one of the AS or the NAS, but the GUTI information will not be carried. Herein, the network slice information carried in at least one of the AS or the NAS is configured to instruct the first network element to select the core network element according to this network slice information. Or, when the UE transmits a second message, the GUTI information is carried in at least one of the AS or the NAS, but the network slice information will not be carried. Herein, the GUTI information carried in at least one of the AS or the NAS is configured to instruct the first network element to select the core network element according to this GUTI information.

Further, the network slice information in this embodiment may be the requested S-NSSAI.

Specifically, in the second message transmitted by the LIE, it is indicated that the routed core network element is determined according to specified information. Herein, the core network element may be selected according to one of the network slice information or GUTI information carried in at least one of the AS and the NAS.

The specific information carried by the UE in at least one of the AS or NAS, may be indicated by the network side. Specifically, the method further includes:

receiving second indication information from a network side, where the second indication information is configured to instruct the network slice information or the GUTI information to be carried in at least one of the AS or the NAS.

Herein, the instruction may be implemented by a designated field in the second indication information. For example, one of the bits in this information may be set as the indication field, when the specific bit is equal to 0, it can be used to indicate the network slice information to be carried, and when the specific bit is equal to 1, it can be used to indicate the GUTI information to be carried. Of course, and vice versa, the corresponding solution will not repeat here again.

That is, according to the second indication information of the network, the UE will determine the information carried in at least one of the AS or the NAS. Herein, only one of the network slice information or the GUTI information is carried in at least one of the AS or the NAS. Therefore, the provided method can minimize the security risks of privacy exposure, because of only one of the S-NSSAI or the GUTI information to be carried. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

Based on the above content, the following is further explained in combination.

The second message is initiated to the network side, where the second message is one of: registration request message, session setup message, session modification message, or location update message.

Part or all of the GUTI information is carried in at least one of the AS or the NAS. Or part or all of the requested network slice information is carried in at least one of the AS or the NAS.

Then, the first network element (e.g. the base station) may select the core network element based on the GUTI information of the AS.

It should be finally noted that, in the art, when the S-NSSAI and the GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure.

Therefore, by adopting the above solutions, it is possible to hand over between the network elements corresponding to the UE based on the request information. As such, the handover between network elements may be implemented immediately without being limited by the current process of the UE. And then the processing efficiency of the UE can be improved.

Ninth Embodiment

Figure 17:
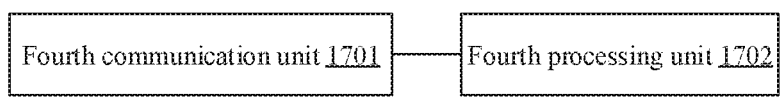
FIG. 17 is a second schematic structural diagram of a network element according to an embodiment of the disclosure.

The embodiment of the disclosure provides a first network element, as illustrated in FIG. 17, which includes a fourth communication unit and a fourth processing unit.

The fourth communication unit 1701 is configured to receive a second message from UE, where the UE carries network slice information in at least one of an AS or a NAS, and does not carry GUTI information.

The fourth processing unit 1702 is configured to select a core network element according to the network slice information.

Or,

The fourth communication unit 1701 is configured to receive a second message from UE, where the UE carries GUTI information in at least one of the AS or the NAS, and does not carry network slice information The fourth processing unit 1702 is configured to select a core network element according to the GUTI information.

This embodiment is aimed at the scenario that there are the network slice information (e.g. S-NSSAI) and the GUTI information at the same time. And only one of the network slice information or the GUTI information will be transmitted.

With regard to which information is selected to be transmitted to the network side, particularly, it may be transmitted randomly; or it may be transmitted according to a preset selection rule, such as, preferred GUTI information or preferentially selected network slice information.

Herein, the second message is one of: registration request message, session setup message, session modification message, or location update message.

Herein, the first network element is an RAN base station.

For instance, when the first network element decides to hand over the UE to another network element, and the UE transmits the second message, the network slice information is carried in at least one of the AS or the NAS, but the GUTI information will not be carried. Herein, the network slice information carried in at least one of the AS or the NAS is configured to instruct the first network element to select the core network element according to this network slice information. Or, when the UE transmits a second message, the GUTI information is carried in at least one of the AS or the NAS, but the network slice information will not be carried. Herein, the GUTI information carried in at least one of the AS or the NAS is configured to instruct the first network element to select the core network element according to this GUTI information.

Further, the network slice information in this embodiment may be the requested S-NSSAI.

Specifically, in the second message transmitted by the UE, it is indicated that the routed core network element is determined according to specified information, Herein, the core network element may be selected according to one of the network slice information or GUTI information carried in at least one of the AS and the NAS.

The specific information carried by the UE in at least one of the AS or NAS, may be indicated by the network side. Specifically, the fourth communication unit transmits second indication information from a network side, where the second indication information is configured to instruct the network slice information or the GUTI information to be carried in at least one of the AS or the NAS.

Herein, the instruction may be implemented by a designated field in the second indication information. For example, one of the bits in this information may be set as the indication field, when the specific bit is equal to 0, it can be used to indicate the network slice information to be carried, and when the specific bit is equal to 1, it can be used to indicate the GUTI information to be carried. Of course, and vice versa, the corresponding solution will not repeat here again.

That is, according to the second indication information of the network, the UE will determine the information carried in at least one of the AS or the NAS. Herein, only one of the network slice information or the Gun information is carried in at least one of the AS or the NAS. Therefore, the provided method can minimize the security risks of privacy exposure, because of only one of the S-NSSAI or the GUTI information to be carried. Specifically, taking the registration request as an example, the registration request message is transmitted in plaintext, and when the GUTI information is included in the registration request message, it is already capable of finding the specific core network element according to the GUTI information, and it is thus unnecessary to carry the requested S-NSSAI, so as to avoid the security risks of exposing the requested S-NSSAI. In addition, the situation where only the requested network slice information rather than the GUTI is carried is similar to the above-mentioned, and it will not be repeated here.

Based on the above content, the following is further explained in combination.

The second message is initiated to the network side, where the second message is one of: registration request message, session setup message, session modification message, or location update message.

Part or all of the GUTI information is carried in at least one of the AS or the NAS. Or part or all of the requested network slice information is carried in at least one of the AS or the NAS.

Then, the first network element (e.g. the base station) may select the core network element based on the GUTI information of the AS.

It should be finally noted that, in the art, when the S-NSSAI and the GUTI exist at the same time, both of them are transmitted to the network side by the UE, and then the network side performs subsequent processing. However, another processing manner is provided in the embodiment above, where only one of the S-NSSAI or the GUTI is transmitted; furthermore, the embodiment provides a method of carrying only one of the S-NSSAI or the GUTI information, thus it is possible to minimize the security risks of privacy exposure.

Therefore, by adopting the above solutions, it is possible to hand over between the network elements corresponding to the UE based on the request information. As such, the handover between network elements may be implemented immediately without being limited by the current process of the UE. And then the processing efficiency of the UE can be improved.

Figure 13:
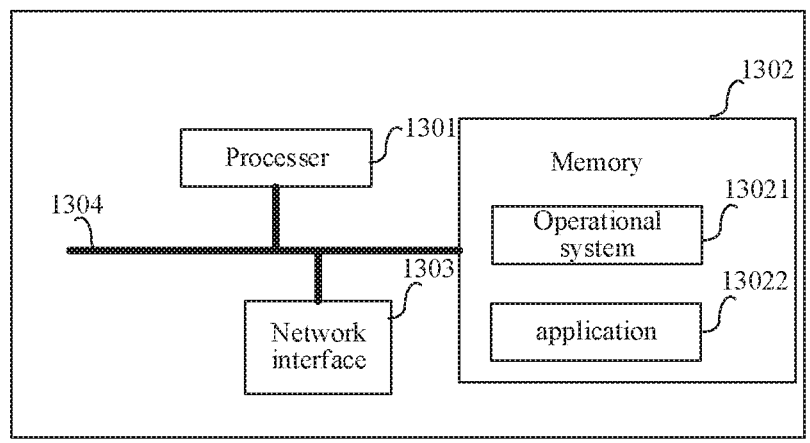
FIG. 13 is a schematic diagram of a hardware architecture according to an embodiment of the disclosure.

There is further provided a hardware composition architecture of the user equipment or the network element. As illustrated in FIG. 13, the hardware composition architecture includes: at least one processor 1301, memory 1302, and at least one network interface 1303. Various components are coupled together via the bus system 1304. Understandably, the bus system 1304 is used to implement connection and communication between these components. In addition to the data bus, the bus system 1304 also includes a power bus, a control bus, and a status signal bus. However, for the sake of clarity, the various busses are illustrated in FIG. 13 as the bus system 1304.

It will be appreciated that the memory 408 may be either a volatile memory or a nonvolatile memory, or can include both volatile and nonvolatile memory.

In some embodiments, the memory 1302 stores the following elements: executable modules or data structures, or their subsets, or their extensions:

There are also an operating system 13021 and an application 13022.

Herein, the processor 1301 is configured to be capable of processing the operations of any one of the aforementioned methods in the embodiments 1-3, 6 or 7, Which will not be repeated here again.

The embodiment of the disclosure provides a computer storage medium having stored thereon computer-executable instructions that, when executed, cause the operations of any one of the aforementioned methods in the embodiments 1-3, 6 or 7 to be performed.

The above devices further provided in the embodiments of the disclosure can be stored in a computer readable storage medium if being realized in the manner of the software function module and sold or used as an independent product. Based on this understanding, the technical solutions of the embodiments of the present disclosure can be embodied in the form of software products in essence or part of contributions to the prior art. The computer software product is stored in a storage medium and includes several instructions for a computer device (which may be a personal computer, a server, or a network device, etc.) to perform all or part of the methods described in the embodiments of the present disclosure. The aforementioned storage medium includes various media that can store program codes, such as a disk, a mobile hard disk, a Read Only Memory (ROM), a magnetic disk, or an optical disk. As such, the present disclosure is not limited to any specific combination of hardware and software.

Although the preferred embodiments of the present disclosure have been disclosed for illustrative purposes, those skilled in the art will realize that various improvements, additions, and substitutions are also possible. Therefore, the scope of the present disclosure should not be limited to the above embodiments.

The invention claimed is:

1. A method for handover between network elements, applied to user equipment (UE), comprising:
    initiating a request message to a network side, wherein the request message comprises information of a second network element, which is carried in an Access Stratum (AS), so that the network side is capable of transmitting the request message to a corresponding network element according to the information of the second network element; the request message further comprises at least one of: information of a first network element or the information of the second network element, which is carried in a Non-Access Stratum (NAS),
    wherein when Globally Unique Temporary Identity (GUTI) information is carried in the AS, network slice information is not carried in the AS.

2. The method of claim 1, further comprising: carrying first indication information in the AS to instruct a Radio Access Network (RAN) base station to select a core network element according to at least one of requested network slice information or GUTI information.

3. The method of claim 1, further comprising:
    receiving, by the UE, a configuration request message from the first network element.

4. The method of claim 3, wherein the request message further comprises:
    part or all of GUTI information of the second network element, which is contained in both the AS and the NAS; wherein the first network element is capable of providing a third network element with a message containing the information of the second network element, so that the third network element transmits the request message to the second network element; or, the first network element is capable of forwarding the request message to the second network element.

5. The method of claim 4, wherein initiating the request message to the network side further comprises: initiating, to the first network element, a routing NAS message or an N2 request message.

6. The method of claim 3, wherein the configuration request message comprises at least one of: registration type, identification information of the second network element, an indication of a GUTI required to be used by the AS, NAS type used, or message type used.

7. The method of claim 6, wherein the request message initiated to the network side comprises at least one of: registration update request message, initial registration request message, attach request message, or location update message.

8. The method of claim 6, wherein the registration type comprises one of:

initial registration, registration update, or emergency registration.

9. The method of claim 1, wherein the GUTI required to be used by the AS comprises at least part of information of a GUTI corresponding to the second network element.

10. The method of claim 9, wherein initiating the request message to the network side comprises:
transmitting a registration request message, an attach request message or a location update message to the network side, wherein part or all of information that is based on the GUTI of the second network element is carried in the AS, and at least one of the following is used in the NAS: part or all of a GUTI of the first network element, or part or all of information of the GUTI or SUbscription Permanent Identifier (SUPI) information mapped from the GUTI of the first network element and used on the second network element.

11. User Equipment (UE), comprising a processor and a memory storing a computer program,
wherein the processor is configured to:
initiate a request message to a network side, wherein the request message comprises information of a second network element, which is carried in an Access Stratum (AS), so that the network side is capable of transmitting the request message to a corresponding network element according to the information of the second network element;
the request message further comprises at least one of:
information of a first network element or the information of the second network element, which is carried in a Non-Access Stratum (NAS),
wherein when Globally Unique Temporary Identity (GUTI) information is carried in the AS, network slice information is not carried in the AS.

12. The UE of claim 11, wherein the processor is further configured to carry first indication information in the AS to instruct a Radio Access Network (RAN) base station to select a core network element according to at least one of requested network slice information and/or GUTI information.

13. The UE of claim 11, wherein the to the processor is further configured to receive a configuration request message from the first network element.

14. The UE of claim 13, wherein the request message further comprises:
part or all of GUTI information of the second network element, which is contained in both the AS and the NAS; wherein the first network element is capable of providing a third network element with a message containing the information of the second network element, so that the third network element transmits the request message to the second network element; or, the first network element is capable of forwarding the request message to the second network element.

15. The UE of claim 14, wherein in order to initiate the request message to the network side, the processor is configured to: initiate, to the first network element, a routing NAS message or an N2 request message.

16. The UE of claim 11, wherein the configuration request message comprises at least one of: registration type, identification information of the second network element, an indication of a GUTI required to be used by the AS, NAS type used, or message type used.

17. The UE of claim 16, wherein the request message comprises at least one of: registration update request message, initial registration request message, attach request message, or location update message.

18. The UE of claim 16, wherein the registration type comprises one of:
initial registration, registration update, or emergency registration.

19. The UE of claim 11, wherein the GUTI required to be used by the AS comprises at least part of information of a GUTI corresponding to the second network element.

20. The UE of claim 19, wherein in order to initiate the request message to the network side, the processor is configured to: transmit a registration request message, an attach request message or a location update message to the network side, wherein part or all of information that is based on the GUTI of the second network element is carried in the AS, and one of the following is used in the NAS: part or all of information of a GUTI of the first network element, or part or all of information of the GUTI or SUbscription Permanent Identifier (SUPI) information mapped from the GUTI of the first network element and used on the second network element.

* * * * *